(12) United States Patent
Pan et al.

(10) Patent No.: US 10,795,912 B2
(45) Date of Patent: Oct. 6, 2020

(54) SYNCHRONIZING A FORWARDING DATABASE WITHIN A HIGH-AVAILABILITY CLUSTER

(71) Applicant: Fortinet, Inc., Sunnyvale, CA (US)

(72) Inventors: Yixin Pan, Burnaby (CA); Yong Wang, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 188 days.

(21) Appl. No.: 16/008,800

(22) Filed: Jun. 14, 2018

(65) Prior Publication Data

US 2019/0286737 A1    Sep. 19, 2019

Related U.S. Application Data

(63) Continuation-in-part of application No. 15/925,249, filed on Mar. 19, 2018.

(51) Int. Cl.
*G06F 16/23*    (2019.01)
*G06F 16/27*    (2019.01)
(Continued)

(52) U.S. Cl.
CPC .......... *G06F 16/27* (2019.01); *G06F 9/45558* (2013.01); *G06F 9/54* (2013.01);
(Continued)

(58) Field of Classification Search
CPC ...... G06F 16/27; G06F 16/23; G06F 16/2365; G06F 16/178; G06F 9/54; G06F 9/45;
(Continued)

(56) References Cited

U.S. PATENT DOCUMENTS

2005/0163115 A1*  7/2005  Dontu .................. H04L 45/00
                                                    370/389
2005/0259649 A1*  11/2005 Smith .................. H04L 45/24
                                                    370/389
(Continued)

OTHER PUBLICATIONS

High Availability Solutions for Transactional Database Systems by Stella Budrean, Yanhong Li and Bipin C. Desai Department of Computer Science, Concordia University, Montreal, Canada pp. 11; IEEE Jul. 28, 2003.*
High Availability Guide (IBM QRadar Version 7.3.3) by IBM Corp. 2012-2019 pp. 50 (Year: 2012).*
Non-Final Office Action for U.S. Appl. No. 15/925,249, dated Jan. 9, 2020, 10 pages.

*Primary Examiner* — Jeffrey C Pwu
*Assistant Examiner* — Ali H. Cheema
(74) *Attorney, Agent, or Firm* — Jaffery Watson Mendonsa & Hamilton LLP

(57) ABSTRACT

Systems and methods for synchronizing an EMACVLAN FDB among cluster units of an HA cluster are provided. According to one embodiment, real-time synchronization of a first FDB maintained within a kernel space of a first network security operating system running on a primary unit and a second FDB maintained within a kernel space of a second network security operating system running on a secondary unit is performed by: transferring information regarding an entry from the kernel space of the first network security operating system to a first synchronization unit running within a user space of the first network security operating system, and causing the second forwarding database to be updated by the first synchronization unit in response to receipt of the information regarding the entry, by transmitting the information regarding the entry to a second synchronization unit running within the user space of the second network security operating system.

26 Claims, 19 Drawing Sheets

(51) Int. Cl.
*G06F 9/54* (2006.01)
*G06F 9/455* (2018.01)
*H04L 29/06* (2006.01)
*H04L 12/707* (2013.01)
*H04L 12/24* (2006.01)
*H04L 12/741* (2013.01)
*H04L 12/721* (2013.01)
*H04L 12/759* (2013.01)

(52) U.S. Cl.
CPC ...... *G06F 16/2365* (2019.01); *H04L 63/0236* (2013.01); *H04L 63/20* (2013.01); *G06F 16/23* (2019.01); *G06F 2009/45595* (2013.01); *H04L 41/0853* (2013.01); *H04L 45/028* (2013.01); *H04L 45/72* (2013.01); *H04L 45/74* (2013.01); *H04L 63/02* (2013.01); *H04L 63/08* (2013.01)

(58) Field of Classification Search
CPC ....... G06F 9/45558; G06F 2009/45595; H04L 63/02; H04L 63/0236; H04L 63/0209; H04L 63/20; H04L 63/08; H04L 61/255; H04L 12/4633; H04L 12/4641; H04L 45/72; H04L 41/0853; H04L 45/028; H04L 45/00; H04L 45/74; H04L 61/103; H04L 67/1095; H04L 45/24; H04L 49/65
USPC ....... 726/5, 13; 707/610, 624; 370/389, 392, 370/395, 409, 410; 709/220
See application file for complete search history.

(56) References Cited

U.S. PATENT DOCUMENTS

| | | | | |
|---|---|---|---|---|
| 2006/0294211 | A1* | 12/2006 | Amato | G06F 15/177 709/220 |
| 2008/0028445 | A1* | 1/2008 | Dubuc | H04L 63/08 726/5 |
| 2013/0107889 | A1* | 5/2013 | Barabash | H04L 61/103 370/409 |
| 2014/0086253 | A1* | 3/2014 | Yong | H04L 12/4633 370/395.53 |
| 2014/0146817 | A1* | 5/2014 | Zhang | H04L 45/74 370/392 |
| 2014/0214761 | A1* | 7/2014 | Leake | G06F 16/178 707/624 |
| 2014/0244851 | A1* | 8/2014 | Lee | H04L 12/4641 709/228 |
| 2015/0032691 | A1* | 1/2015 | Hall | H04L 29/06 707/610 |
| 2015/0207723 | A1* | 7/2015 | Cors | H04L 41/0853 370/410 |
| 2015/0358232 | A1* | 12/2015 | Chen | H04L 45/72 370/392 |
| 2017/0033992 | A1* | 2/2017 | Dichtel | H04L 49/65 |
| 2017/0093834 | A1* | 3/2017 | Natu | H04L 63/08 |
| 2019/0238636 | A1* | 8/2019 | Li | H04L 67/1095 |

\* cited by examiner

600 →

```
#define MACVLAN_MAX_NUM      512
#define MACVLAN_HASH_SIZE    (1 << 8)
#define MACVLAN_HASH_MASK    (MACVLAN_HASH_SIZE - 1)
struct macvlan_port {
    struct net_device   *dev;/* point to the object of lower interface */
    int                 count;/* 0 to MACVLAN_MAX_NUM */
    unsigned long       bitmap[BITS_TO_LONGS(MACVLAN_MAX_NUM)];

spinlock_t          macvlan_mac_lock;
    int                 mac_num;
    struct hlist_head   mac_hash[MACVLAN_HASH_SIZE];
    struct timer_list   mac_gc_timer;

```
struct macvlan_dev {
    struct net_device   *dev;/* point to "struct net_device" object of EMACVLAN sub-interface. */
    struct macvlan_port *port;  /* point to "struct macvlan_port" object of lower interface. */ unsigned short      macvlan_id;
    unsigned int        learn_mac:1;

```
#define MACVLAN_FDB_T_LOCAL        0x01
#define MACVLAN_FDB_T_STATIC       0x02
define MACVLAN_FDB_T_DYNAMIC      0x04 struct macvlan_fdb_entry {
    struct hlist_node    hash_link;

struct macvlan_dev   *macdev;       /* specify the bound interface */
    unsigned char        mac_addr[ETH_ALEN];
    unsigned char        mac_type;
    unsigned long        last_used;

SYNCHRONIZING A FORWARDING DATABASE WITHIN A HIGH-AVAILABILITY CLUSTER

CROSS-REFERENCE TO RELATED PATENTS

This application is a continuation-in-part of U.S. patent application Ser. No. 15/925,249, filed Mar. 19, 2018, which is hereby incorporated by reference in its entirety for all purposes. Contained herein is material that is subject to copyright protection.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to the field of Virtual Local Area Networks (VLANs) and high-availability (HA) clusters, and more particularly to a protocol to achieve real-time synchronization of an enhanced media access control (MAC) VLAN (EMACVLAN) forwarding database among HA primary and secondary cluster units.

Description of the Related Art

A Local Area Network (LAN) provides networking capability and communication links to various workstations and computing devices. Generally, LANs are built to enable sharing of resources and services such as files, printers, applications, software, internet access, and the like. Modern LANs are predominantly based on Wi-Fi or Ethernet for interconnection of computing devices. A Wi-Fi based LAN implements one or more wireless access points that manage network traffic flowing to and from the computing devices. An Ethernet based LAN, on the other hand, consists of one or more hubs, switches, or routers that are connected to computing devices through Ethernet cables.

A Virtual Local Area Network (VLAN) enables logical grouping of workstations, computing devices and various network devices that appear to be on the same LAN. Implementation of a VLAN provides scalability and security with ease of network management and can enable seamless adaption to changes in network requirements and relocation of workstations and computing devices.

As discussed further below with reference to FIG. 2, in existing VLAN architectures, when virtual domains (VDOMs) or virtual firewalls of a virtualized network security appliance need to communicate with one or more external network devices, such as an outside router that is not on the VLAN, the use of an intermediate front-end transparent (TP) VDOM is required to be logically interposed between the virtual firewalls and the physical Ethernet interface of the virtualized network security appliance coupled to the external network. Such use of the TP VDOM does not support High Availability (HA) active-active (AA) mode, and, in HA active-passive (AP) mode requires all related virtual firewalls to be in a single virtual cluster. Use of the intermediate TP VDOM to enable communication between the VDOMs and external network devices also requires interfaces to be defined between each of the VDOMs and the TP VDOM, which results in the establishment of two sessions for each traffic flow thereby reducing the maximum number of concurrent sessions to half of its normal setup. Also, in such existing architectures, as each packet traverses the system twice, the systems' throughput is degraded.

There is therefore a need for an improved VLAN architecture that overcomes the above-mentioned and other disadvantages associated with use of TP VDOM as a means to connect with external network devices.

SUMMARY

Systems and methods are described for synchronizing an EMACVLAN forwarding database (FDB) among cluster units of a high-availability (HA) cluster. According to one embodiment, a primary virtualized network security device (which is referred to as primary unit or primary cluster unit, hereinafter) and a secondary virtualized network security device (which is referred as primary unit or primary cluster unit, hereinafter) of an HA cluster. When a packet is received by an internal switch running on the primary unit via a sub-interface of a physical Ethernet interface (which is referred to as parent interface, hereinafter) of the primary unit, a first FDB maintained by the primary unit within a kernel space of a first network security operating system running on the primary unit is caused to learn or update an association between a source MAC address of the packet and the sub-interface by storing an entry in the first FDB containing the source MAC address and information regarding the sub-interface. In response to the learned or updated association, real-time synchronization of the first FDB and a second FDB maintained by the secondary unit within a kernel space of a second network security operating system running on the secondary unit is performed by: (i) transferring information regarding the entry from the kernel space of the first network security operating system to a first synchronization unit running within the user space of the first network security operating system via a first interprocess communication (IPC) interface of the first network security operating system; and (ii) causing the second forwarding database to be updated by the first synchronization unit in response to receipt of the information regarding the entry, by transmitting the information regarding the entry to a second synchronization unit running within the user space of the second network security operating system via a host-to-host communication service.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 6A and 6B are code fragments illustrating exemplary implementation details relating to sub-interface creation in accordance with an embodiment of the present invention.

FIG. 8 is a code fragment illustrating an exemplary data structure for a forwarding database entry in accordance with an embodiment of the present invention.

DETAILED DESCRIPTION

Figure 1A:
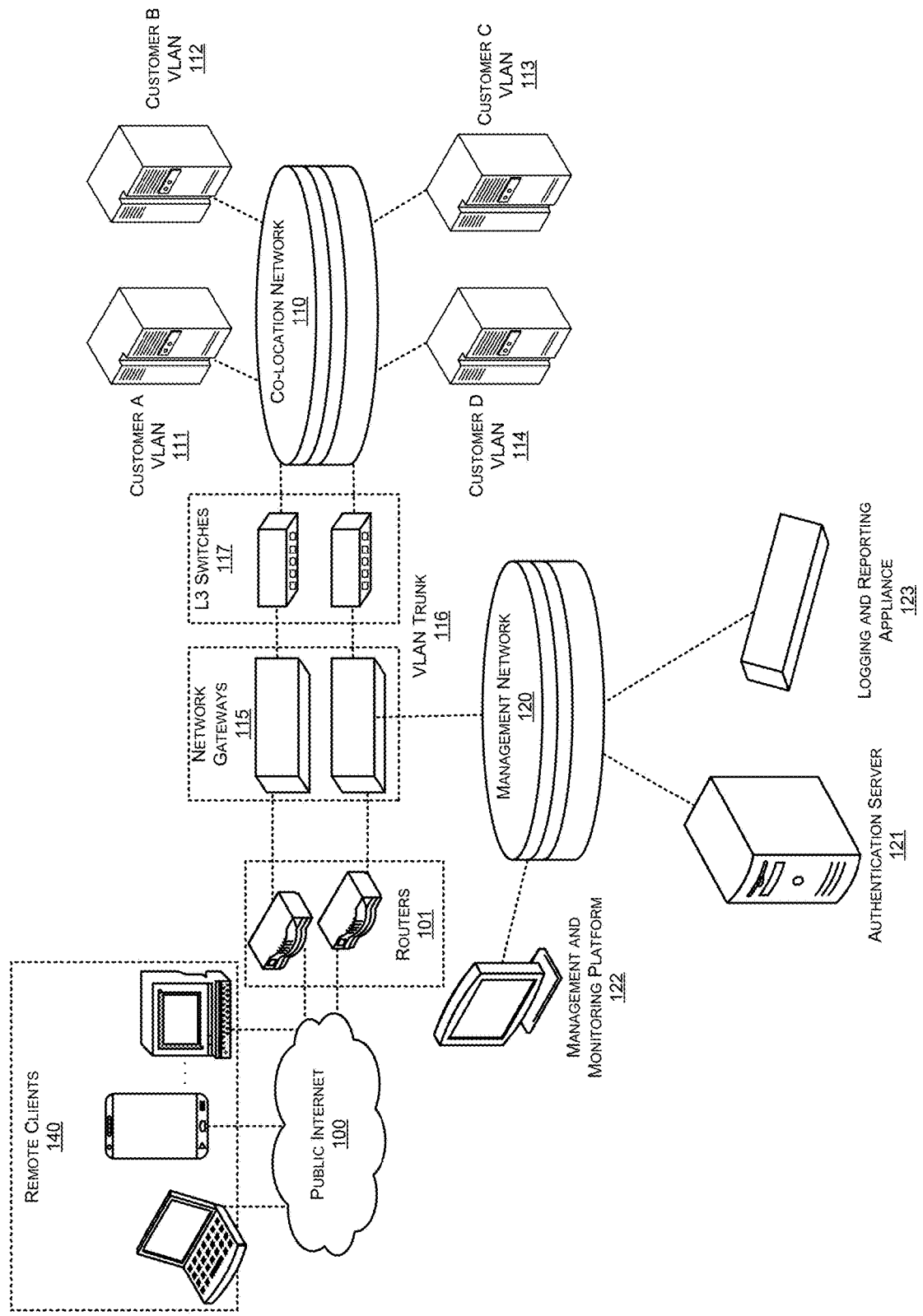
FIGS. 1A and 1B illustrate exemplary usage models for virtual domains (VDOMs) in Virtual Local Area Network (VLAN) architectures in accordance with an embodiment of the present invention.

Systems and methods are described for synchronizing an EMACVLAN forwarding database (FDB) among cluster units of a high-availability (HA) cluster. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping - that can be deployed individually as a point solution or in various combinations as a unified threat management (UTM) solution. Non-limiting examples of network security devices include proxy servers, firewalls, VPN appliances, gateways, UTM appliances and the like.

The phrase "virtual domain" or the acronym VDOM generally refer to a method of dividing a single physical network security device (e.g., a UTM appliance) into two or more virtual units that function as multiple independent units. In the context of a UTM appliance, each VDOM can provide completely separate firewalling, routing, UTM, VPN, and next generation firewall services on behalf of multiple customers or multiple departments of an enterprise, for example.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Systems and methods are described for synchronizing an EMACVLAN FDB among cluster units of an HA cluster. According to various embodiments of the present disclosure, in order to support efficient failover from the primary unit to a secondary unit of the HA cluster and enable uninterrupted flow of network traffic, the EMACVLAN FDBs are synchronized when new FDB entries are learned by the primary unit, when FDB entries expire in the EMACVLAN FDB of the secondary unit and/or when a new secondary unit joins the HA cluster. Thus, the secondary unit will remain in sync with EMACVLAN FDB of the primary unit, so that when an HA failover occurs, the secondary unit can take up the functionality of the primary unit for seamless processing of network traffic.

An aspect of the present disclosure pertains to a method that can include receiving, by an internal switch running on a primary virtualized network security device (primary unit), a packet via a sub-interface of a physical Ethernet interface of the primary unit and wherein the primary unit and a secondary virtualized network security device (secondary unit) are part of a (HA) cluster; causing, by the internal switch, a first FDB maintained by the primary unit within a kernel space of a first network security operating system running on the primary unit to learn or update an association between a source MAC address of the packet and the sub-interface by storing an entry in the first FDB containing the source MAC address and information regarding the sub-interface; and performing real-time synchronization of the first FDB and a second FDB maintained by the secondary unit within a kernel space of a second network security operating system running on the secondary unit by responsive to the learned or updated association: transferring, via a first interprocess communication (IPC) interface of the first network security operating system, information regarding the entry from the kernel space of the first network security operating system to a first synchronization unit running within the user space of the first network security operating system; and causing, by the first synchronization unit, the second FDB to be updated by responsive to receipt of the information regarding the entry, by transmitting, via a host-to-host communication service, the information regarding the entry to a second synchronization unit running within the user space of the second network security operating system.

In an embodiment, the method can further include when an entry in the second FDB expires and has been removed from the second FDB: receiving, by the first synchronization unit, via the host-to-host communication service, a message requesting a corresponding entry to the expired entry; transferring, by the first synchronization unit via a system call of the first network security operating system, a request for the corresponding entry to the kernel space of the first network security operating system; and when the corresponding entry exists in the first FDB, causing the corresponding entry to be added to the second FDB by transmitting, via the host-to-host communication service, information regarding the corresponding entry to the second synchronization unit.

In an embodiment, the method can further include when an entry in the second FDB expires: removing the expired entry from the second FDB; transferring, via a second IPC interface of the second network security operating system, information regarding the expired entry from the kernel space of the second network security operating system to the second synchronization unit; and determining whether the expired entry has also expired within the first FDB by requesting, by the second synchronization unit, information regarding a corresponding entry to the expired entry from the first FDB by issuing a query via the host-to-host communication service, to the first synchronization unit; and when said determining is negative, then adding the corresponding entry returned responsive to the query to the second FDB.

In an embodiment, the method can further include when an additional secondary virtualized network security device joins the HA cluster: receiving, by the first synchronization unit, via the host-to-host communication service, a message requesting entries associated with a particular virtual domain (VDOM) associated with the HA cluster from the first FDB; and responsive to the message, for each VDOM entry of the entries: transferring, by the first synchronization unit via a system call of the first network security operating system, a request for the VDOM entry to the kernel space of the first network security operating system; and synchronizing the VDOM entry to an FDB maintained by the additional secondary virtualized network security device by responsive to a response to the request, transferring, via the first IPC interface, information regarding the VDOM entry to a third synchronization unit running in a user space of a third network security operating system running on the additional secondary virtualized network security device.

In an embodiment, the first IPC interface can include a first netlink socket established between a process in the kernel space of the first network security operating system and the first synchronization unit.

In an embodiment, the first synchronization unit can include a daemon.

In an embodiment, the host-to-host communication service can include a Transmission Control Protocol (TCP)/User Datagram Protocol (UDP) socket established between the first synchronization unit and the second synchronization unit.

In an embodiment, the second IPC interface can include a second netlink socket established between a process in the kernel space of the second network security operating system and the second synchronization unit.

In an embodiment, the second synchronization unit can include a daemon.

In an embodiment, the system call can include an input/output control (ioctl) system call.

In an embodiment, the physical Ethernet interface can include any or a combination of an aggregate interface and a Virtual Local Area Network (VLAN) interface.

Another aspect of the present disclosure pertains to a non-transitory computer-readable storage medium embodying a set of instructions, which when executed by one or more processors of a primary unit of a HA cluster, can cause the one or more processors to perform a method that can include: receiving, by an internal switch running on a primary unit, a packet via a sub-interface of a physical Ethernet interface of the primary unit and wherein a secondary unit is also part of the HA cluster; causing, by the internal switch, a first FDB maintained by the primary unit within a kernel space of a first network security operating system running on the primary unit to learn or update an association between a source MAC address of the packet and the sub-interface by storing an entry in the first FDB containing the source MAC address and information regarding the sub-interface; and performing real-time synchronization of the first FDB and a second FDB maintained by the secondary unit within a kernel space of a second network security operating system running on the secondary unit by responsive to the learned or updated association: transferring, via a first interprocess communication (IPC) interface of the first network security operating system, information regarding the entry from the kernel space of the first network security operating system to a first synchronization unit running within the user space of the first network security operating system; and causing, by the first synchronization unit, the second FDB to be updated by responsive to receipt of the information regarding the entry, by transmitting, via a host-to-host communication service, the information regarding the entry to a second synchronization unit running within the user space of the second network security operating system.

Figure 1B:
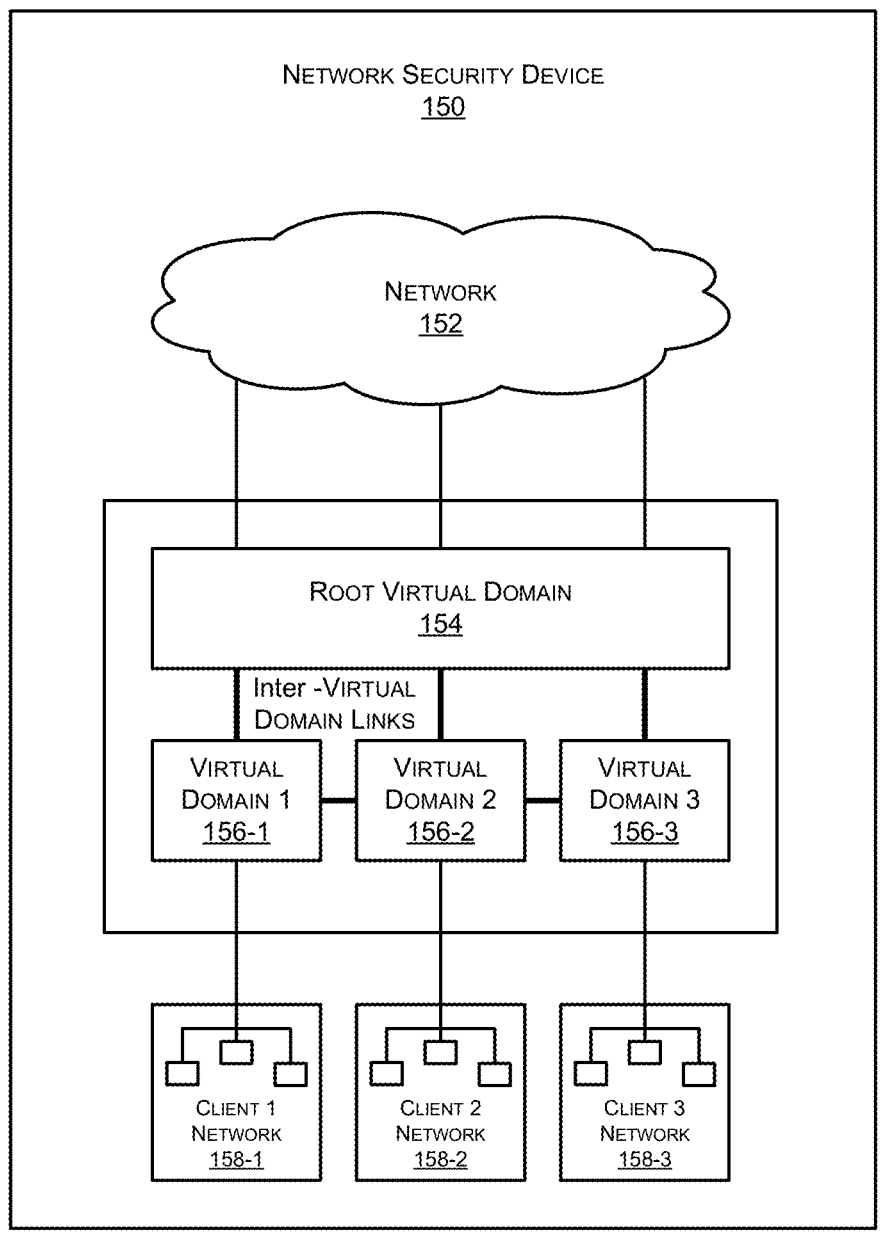

FIGS. 1A and 1B illustrate exemplary usage models for virtual domains (VDOMs) in Virtual Local Area Network (VLAN) architectures in accordance with an embodiment of the present invention.

According to the example architecture as illustrated in FIG. 1A, a co-location network 110 can be communicatively coupled with an external network (e.g., public Internet 100) through one or more intermediate networking devices, such as routers 101, network gateways 115 and layer 3 (L3) switches 117. Each entity can have a corresponding virtual local area network (VLAN), for example, Customer A VLAN 111, Customer B VLAN 112, Customer C VLAN 113 and Customer D VLAN 114 with which the customer's telecommunications and/or network equipment can be associated. Consequently, end users of an entity can access the pubic Internet 100 from their respective VLANs by way of the intermediate devices or end users may access various services and data provided by co-location network 110 by way of remote clients 140 connected to the public Internet 100. Network gateways 115 represent network security devices (e.g., one of the FORTIGATE family of multi-threat security systems or Enterprise Series antivirus firewalls).

According to an embodiment, co-location network 110 can be managed using a management network 120. Management network 120 can include an authentication server 121, a management and monitoring platform 122 and a logging and reporting appliance 123. Authentication server 121 can include a database supplemented to include information intended to be used to facilitate routing of subscriber traffic flows by network gateways 115 to appropriate VLANs. In one embodiment, an authentication database may be augmented to include a VLAN name, a Virtual Domain (VDOM) name and/or an interface name that can be used by network gateways 115 to identify an appropriate physical interface onto which to forward traffic of an authenticated end user. In alternative embodiments, authentication may be performed by various other means, including, but not limited to a directory access protocol-based authentication protocol, such as Lightweight Directory Access Protocol (LDAP), a Terminal Access Controller Access Control System (TACACS) authentication protocol, such as Terminal Access Controller Access Control System (TACACS), extended TACACS (XTACACS), TACACS+ or a successor to RADIUS, such as Diameter.

Management and monitoring platform 122 can provide a central management solution for deploying, provisioning, configuring, maintaining and otherwise managing and monitoring of network gateways 115 and resources associated with co-location network 110. In one embodiment, management and monitoring platform 112 can include a FORTIMANAGER management and monitoring platform available from Fortinet, Inc. of Sunnyvale, Calif.

Further, logging and reporting appliance 123 can log, gather, correlate, analyze and store event data from across the co-location network architecture and provides a reporting architecture that can facilitate report creation. The reporting capabilities of logging and reporting appliance 123 can encompass many types of traffic including one or more of network, Web, FTP, Terminal, Mail, Intrusion, Antivirus, Web Filter, Mail Filter, VPN and Content. Logging and reporting appliance 123 can also provide advanced logging with meta content logs to facilitate with regulatory compliance, such as the Health Insurance Portability and Accountability Act (HIPAA) and Sarbanes-Oxley (SOX), by allowing high-level monitoring of HTTP, FTP, IMAP, POP3 and SMTP traffic from network gateways 115 and/or resources associated with co-location network 110. In one embodiment, logging and reporting appliance 123 comprises one of the FORTIANALYZER family of real-time network logging, analyzing and reporting systems available from Fortinet, Inc. of Sunnyvale, Calif.

According to the architecture illustrated in FIG. 1B, a root VDOM 154 that can be a physical domain can have access to the external network 152 or the public Internet. The physical domain can be split into virtual domains such as VDOM 156-1, VDOM 156-2 and VDOM 156-3. Root VDOM 154 can represent a management VDOM and other VDOMs (156-1, 156-2, 156-3) can be connected to root VDOM 154 with inter-virtual VDOM links. Therefore, VDOMs (156-1, 156-2, 156-3) can rely on root VDOM 154 for Internet access or communication with external network 152. Each VDOM (156-1, 156-2, 156-3) can have its own specific configuration and management interfaces, VLANs, zones, firewall policies, routing and VPNs.

In an example, multiple interfaces can be added to a VDOM (156-1, 156-2, 156-3) by combining the multiple interfaces into a hardware switch interface of a VLAN. The hardware switch interface of a VLAN can be treated as a single interface by network security device 150. For example, client network 158-1 can be added to VDOM 156-1, client network 158-2 can be added to VDOM 156-2, and client network 158-3 can be added to VDOM 156-3.

Figure 2:
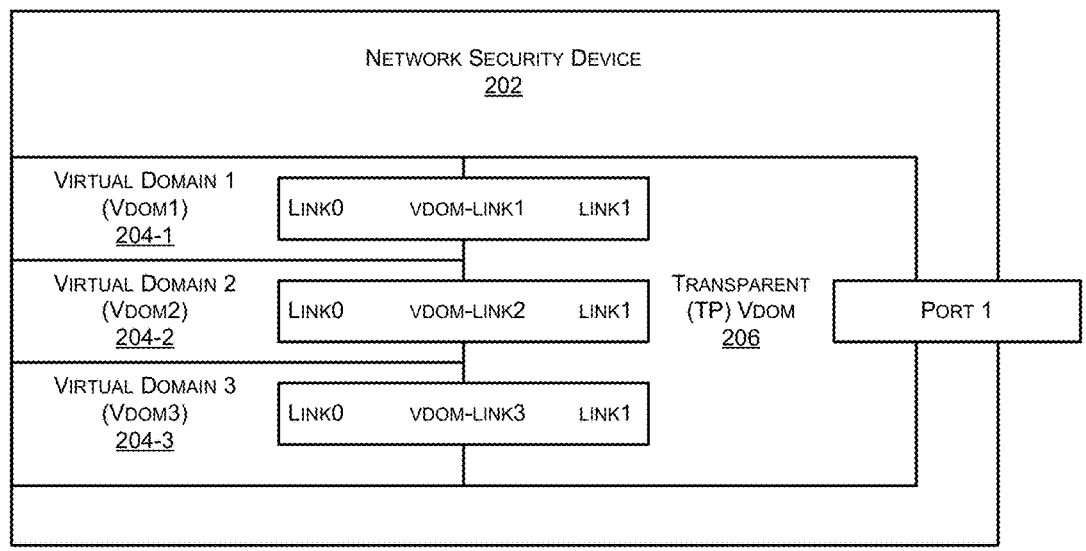
FIG. 2 is a simplified block diagram conceptually illustrating a prior art technique for enabling communications between one or more virtual domains and an external network device.

FIG. 2 is a simplified block diagram conceptually illustrating a prior art technique for enabling communications between one or more virtual domains and an external network device.

As illustrated in FIG. 2, in existing VLAN architectures, when virtual domains or virtual firewalls (which may be collectively referred to as VDOMs 204 herein) of a virtualized network security device 202 need to communicate with one or more external network devices, such as an outside router that is not on the VLAN, the use of an intermediate front-end transparent (TP) VDOM 206 is required to be logically interposed between VDOMS 204 and the physical Ethernet interface (e.g., Port 1) of virtual network security device 202 coupled to the external network. Such use of TP VDOM 206 does not support HA active-active (AA) mode. Also, use of TP VDOM 206 in HA active-passive (AP) mode requires that all related VDOMs be in one virtual cluster. Further, use of intermediate TP VDOM 206 to enable communication between VDOMs 202 and external network devices also requires intermediate interfaces (e.g., VDOM-Link1, VDOM-Link 2 and VDOM-Link3) to be defined between each of the VDOMs 204 and TP VDOM 206, which results in the establishment of two sessions for each traffic flow thereby reducing the maximum number of concurrent sessions to half of its normal setup. Also, in such existing architectures, as each packet traverses the system twice, the throughput of the system is degraded.

Figure 3:
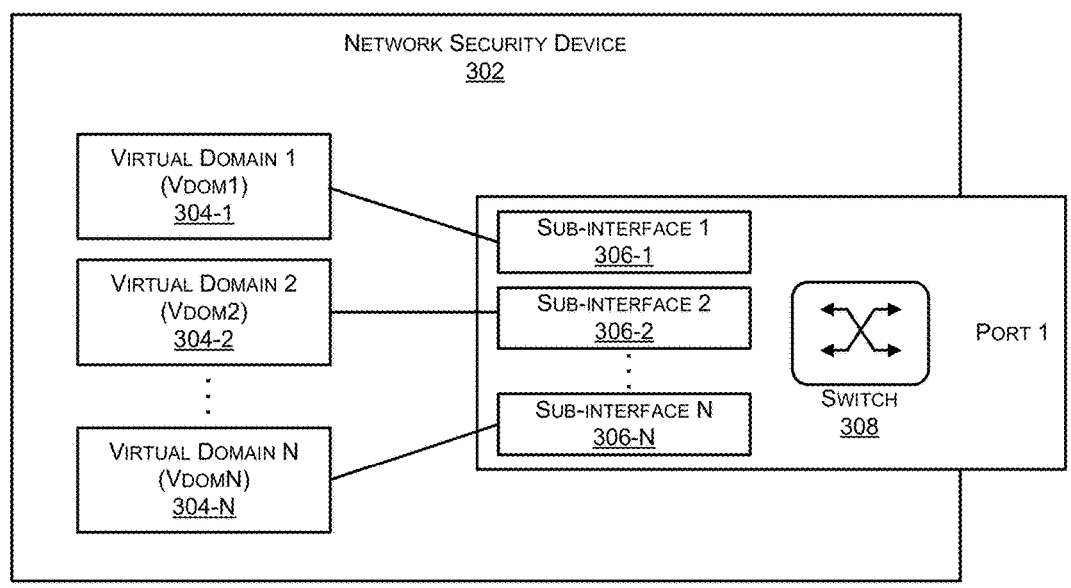
FIG. 3 is a simplified block diagram conceptually illustrating the use of enhanced media access control (MAC) VLAN (EMACVLAN) sub-interfaces to facilitate more efficient communication between one or more virtual domains and an external network device in accordance with an embodiment of the present invention.

FIG. 3 is a simplified block diagram 300 conceptually illustrating the use of enhanced media access control (MAC) VLAN (EMACVLAN) sub-interfaces to facilitate more efficient communication between one or more virtual domains and an external network device in accordance with an embodiment of the present invention.

Figure 5:
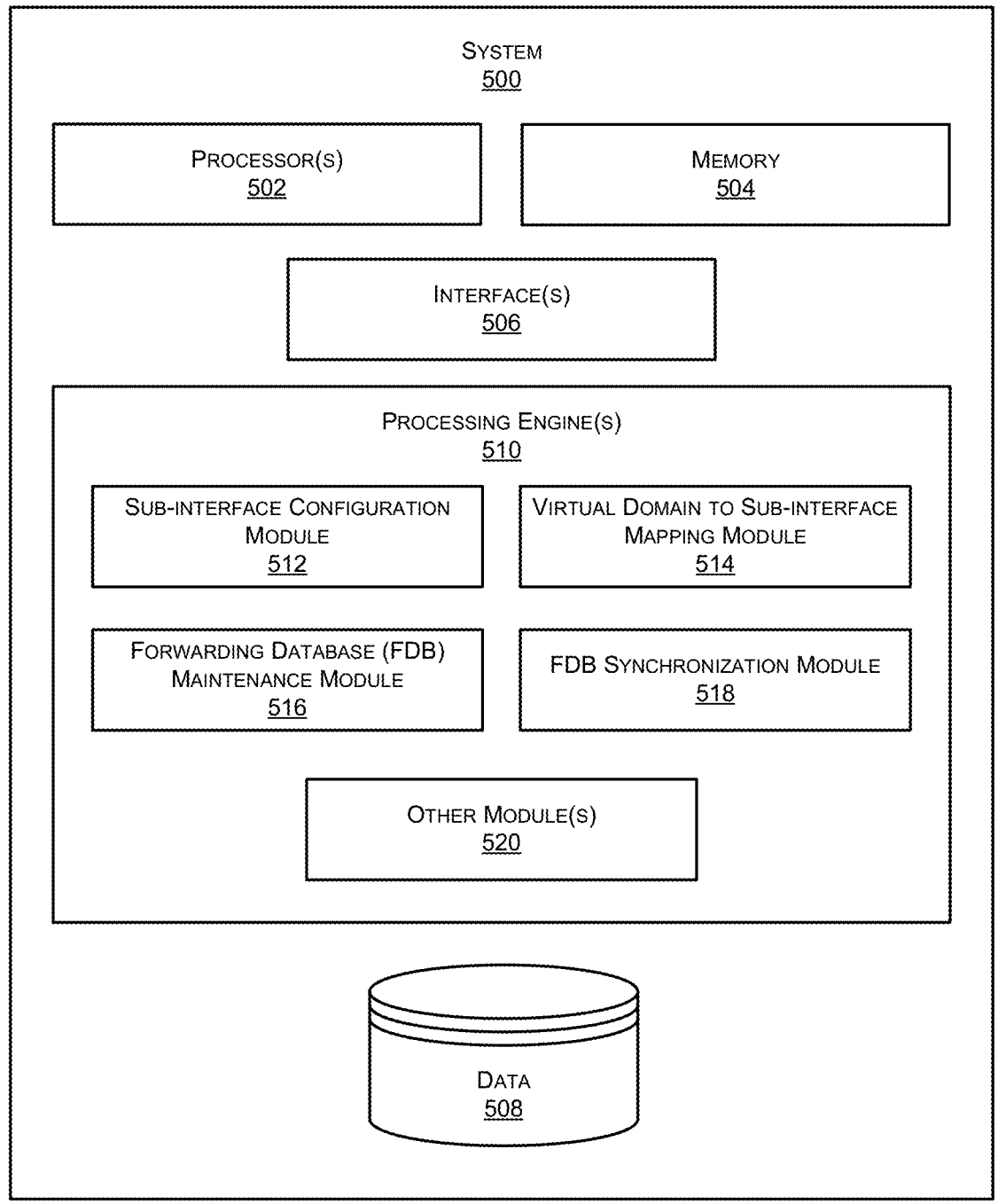
FIG. 5 is a module diagram illustrating functional units of a system to enable communication between one or more virtual domains and an external network device in accordance with an embodiment of the present invention.

In the context of the present example, an improved VLAN architecture uses a MAC-VLAN switch 308 for providing a means to connect with external network devices that can overcome the above-mentioned and other disadvantages associated with the use of TP VDOM 206. According to an aspect, a system 500 (as illustrated in FIG.5) can allow configuration of sub-interfaces 306 of a parent physical Ethernet interface (as indicated by PORT 1) (which may also be referred to as the parent interface, hereinafter). Each of the configured sub-interfaces 306 can be associated with a unique media access control (MAC) address and consequently a unique Internet Protocol (IP) address. Applications (e.g., network security functionality, including, but not limited to a firewall) running within VDOMs 304 can then bind to a specific sub-interface 306 in order to connect directly to the physical network of virtualized network security device 302 using the respective unique MAC address and IP address. Further, the improved VLAN architecture can utilize techniques to perform real-time synchronization of an FDB (not shown) maintained by a primary cluster unit that maps MAC addresses to sub-interfaces 306 of the physical Ethernet interface with an FDB (not shown) maintained by a secondary cluster unit.

Although embodiments of the present disclosure have been described using a virtualized network security device 302, it should be appreciated that the same has been done merely to illustrate the invention in an exemplary manner and implementation of system 500 using any other network device or computing device, is well within the scope of the present disclosure. A detailed explanation of system 500 is further provided with reference to FIG. 5.

Figure 4A:
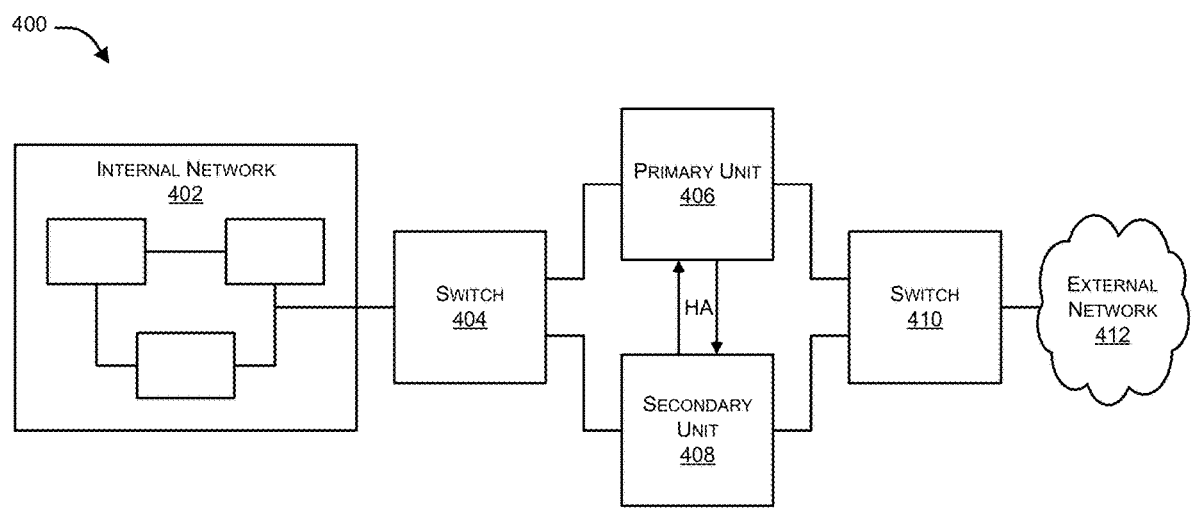
FIG. 4A illustrates an exemplary VLAN architecture supporting high availability (HA) mode in accordance with an embodiment of the present invention.

FIG. 4A illustrates an exemplary VLAN architecture 400 supporting high availability (HA) mode in accordance with an embodiment of the present invention.

In an embodiment, an exemplary VLAN architecture 400 can include a primary virtualized network security device (identified as primary unit 406) and a secondary virtualized network security device (identified as secondary unit 408) operating as part of an HA cluster. Secondary unit 408 can be a backup unit, which can be installed and connected to a previously installed primary unit 406, to provide redundancy if primary unit 406 fails. A switch 410 can be used to couple primary unit 406 and secondary unit 408 with external network 412 and another switch 404 can be used to couple primary unit 406 and secondary unit 408 with internal network 402.

In context of the present example, traffic passes through primary unit 406. However, if primary unit 406 becomes unavailable, secondary unit 408 can process the traffic. Further, primary unit 406 and secondary unit 408 can reverse roles when both virtualized network security devices are available again. Thus, VLAN architecture 400, which supports HA mode, improves network reliability.

Figure 4B:
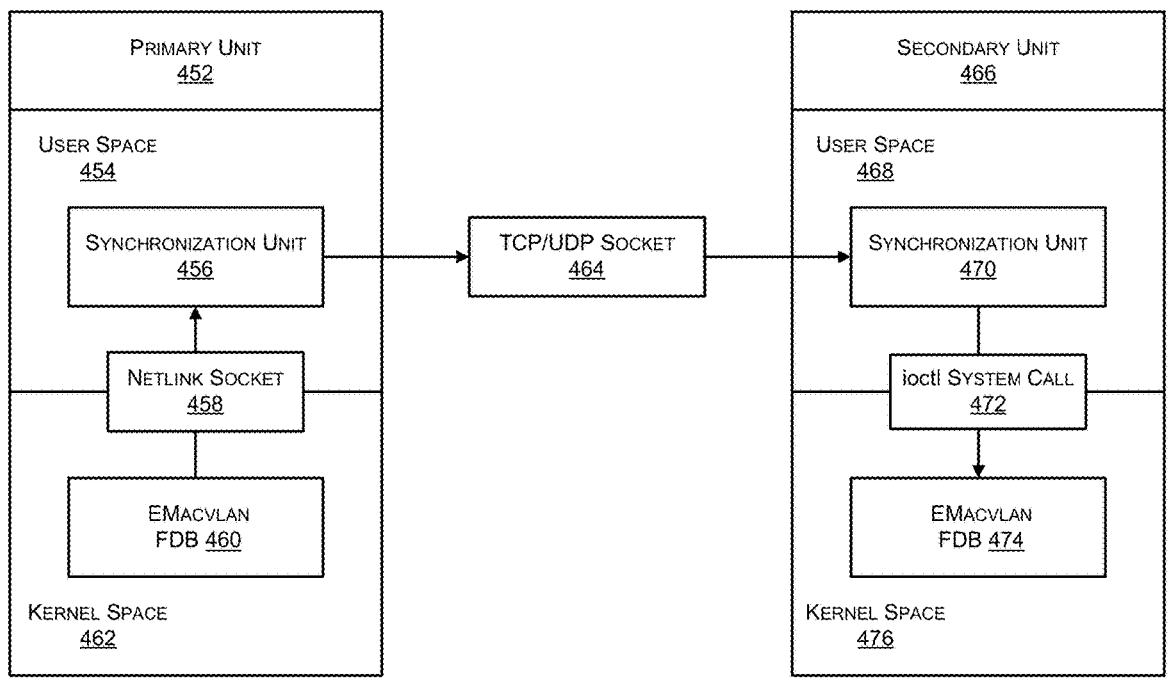
FIG. 4B is a block diagram illustrating use of a primary unit and a secondary unit in a VLAN architecture to support HA mode in accordance with an embodiment of the present invention.

FIG. 4B is a block diagram 450 illustrating use of a primary unit 452 and a secondary unit 466 in a VLAN architecture 450 to support HA mode in accordance with an embodiment of the present invention.

In the context of the present example, a first FDB (i.e., EMACVLAN FDB 460 of primary unit 452) stores a learned association between a source MAC address of a packet and a sub-interface when the packet passes through the parent interface. In each unit of the HA cluster the FDB database can be maintained in kernel space of the respective network security operating systems. For example, EMACVLAN FDB 460 can be maintained within kernel space of a first network security operating system running on primary unit 452, and EMACVLAN FDB 474 can be maintained within kernel space of a second network security operating system running on secondary unit 466. Similarly, in each unit of the HA cluster, a synchronization unit can be maintained in user space of the respective network security operating systems that can work as a proxy to exchange information among HA cluster units. For example, synchronization unit 456 can be maintained within user space of the first network security operating system running on primary unit 452 and synchronization unit 470 can be maintained within user space of the second network security operating system running on secondary unit 466. Synchronization units can utilize a host-to-host communication service to carry out the real-time synchronization of the FDB. A non-limiting example of the host-to-host communication service is a Transmission Control Protocol (TCP)/User Datagram Protocol (UDP) socket 464 established between synchronization unit 456 and synchronization unit 470.

The FDB data transfer from kernel space to user space in each unit can be performed using an interprocess communication (IPC) interface. In the context of a Linux operating system, primary unit 452 and secondary unit 456, the IPC interface may be in the form of a netlink socket for transferring data from kernel space 462 to user space 454. The FDB data transfer from user space 468 to kernel space 476 in secondary unit 466 can be in from of a request made to kernel space 476 via a system call. In the context of a Linux operating system, the system call may be in the form of an input/output control (ioctl) system call for transferring data from user space 468 to kernel space 476.

FIG. 4B illustrates a path along which FDB entries can be transferred from primary unit 452 to secondary unit 466. Information regarding an FDB entry can be transferred from EMACVLAN FDB 460 within kernel space 462 to synchronization unit 456 within user space 454 using netlink socket 458 and can further be transferred to synchronization unit 470 within user space 468 using TCP/UDP socket 464. Subsequently, the entry can be updated within EMACVLAN FDB 474 residing within kernel space 476 using ioctl system call 472.

FIG. 5 is a module diagram illustrating functional units of a system 500 to enable communication between one or more virtual domains and an external network device in accordance with an embodiment of the present invention.

As illustrated, system 500, which may represent a network security device (e.g., a network gateway 115), can include one or more processor(s) 502. Processor(s) 502 can be implemented as one or more microprocessors, microcomputers, microcontrollers, digital signal processors, central processing units, logic circuitries, and/or any devices that manipulate data based on operational instructions. Among other capabilities, processor(s) 502 are configured to fetch and execute computer-readable instructions stored in a memory 504 of system 500. Memory 504 can store one or more computer-readable instructions or routines, which may be fetched and executed to create or share the data units over a network service. Memory 504 can include any non-transitory storage device including, for example, volatile memory such as RAM, or non-volatile memory such as EPROM, flash memory, and the like. In an example embodiment, memory 504 may be a local memory or may be located remotely, such as a server, a file server, a data server, and the Cloud.

System 500 can also include one or more interface(s) 506. Interface(s) 506 may include a variety of interfaces, for example, interfaces for data input and output devices, referred to as I/O devices, storage devices, and the like. Interface(s) 506 may facilitate communication of system 500 with various devices coupled to system 500. Interface(s) 506 may also provide a communication pathway for one or more components of system 500. Examples of such components include, but are not limited to, processing engine(s) 510 and data 508.

Processing Engine(s) 510 can be implemented as a combination of hardware and software or firmware programming (for example, programmable instructions) to implement one or more functionalities of engine(s) 510. In the examples described herein, such combinations of hardware and software or firmware programming may be implemented in several different ways. For example, the programming for the engine(s) may be processor executable instructions stored on a non-transitory machine-readable storage medium and the hardware for engine(s) 510 may include a processing resource (for example, one or more processors), to execute such instructions. In the examples, the machine-readable storage medium may store instructions that, when executed by the processing resource, implement engine(s) 510. In such examples, system 500 can include the machine-readable storage medium storing the instructions and the processing resource to execute the instructions, or the machine-readable storage medium may be separate but accessible to system 500 and the processing resource. In other examples, processing engine(s) 510 may be implemented by electronic circuitry. Data 508 can include data that is either stored or generated as a result of functionalities implemented by any of the components of processing engine(s) 510.

In an example, processing engine(s) 510 can include a sub-interface configuration module 512, a virtual domain to sub-interface mapping module 514, a forwarding database (FDB) maintenance module 516, an FDB synchronization module 518 and other module(s) 520. Other module(s) 520 can implement functionalities that supplement applications or functions performed by system 500 or processing engine(s) 510.

In an aspect, sub-interface configuration module 512 can configure sub-interfaces of a parent physical Ethernet interface (which may be referred to as a parent interface, hereinafter). Those skilled in the art will appreciate that sub-interfaces are virtual interfaces that can be created by dividing the parent interface into multiple logical interfaces and can be used for sending and receiving data. Parent interface can be an interface such as an aggregate interface, a Virtual Local Area Network (VLAN) interface, etc. Examples of parent interface can also include a network interface card, a network adapter, a LAN adapter, and the like. Further, the sub-interfaces are configured with an Internet Protocol (IP) address.

In an embodiment, sub-interface configuration module 512 can further maintain a count of the number of sub-interfaces that are created for each parent interface, where the maximum number of sub interfaces that may be created for a parent interface can be limited. The sub-interface can be created using a sub-interface object that can be associated with an object of the parent interface. The count of the number of sub-interfaces can be maintained using a "count" field in the object associated with the parent interface, which is further explained with reference to FIG. 6A. The count can be incremented when a sub-interface is created and the count can be decremented when a sub-interface is deleted. Also, when a sub-interface is deleted, the object of the sub-interface can be freed and when all sub-interfaces are deleted, for a particular parent interface (i.e., when the count is zero), the object of the parent interface can be freed.

Those skilled in the art will appreciate that certain applications, such as legacy applications or applications that monitor network traffic or applications that perform network security functions, are directly connected to a physical network. Thus, each sub-interface can be assigned a MAC address, thereby making the sub-interface appear as a physical interface that can be directly connected to the physical network. Therefore, in an embodiment, each sub-interface can be associated with a unique MAC address that can be generated based on a MAC address of the parent interface. For generation of the unique MAC address each sub-interface can be allocated a unique sub-interface identifier. When a sub-interface is created, a "bitmap" field can be used to allocate the smallest non-negative available integer to a sub-interface as a corresponding unique identifier that can be further used in connection with generating the unique MAC address for the sub-interface based on the MAC address of the parent interface as described further below.

Further, each virtual domain or a VDOM can provide separate security domains that can allow separate zones, user authentication, firewall policies, routing and Virtual Private Network (VPN) configurations. In an aspect, a virtual domain to sub-interface mapping module 514, can map an application (e.g., a firewall) within a VDOM to a specific sub-interface of the configured sub-interfaces of the parent interface. Such a technique can enable the application to communicate with external network devices.

In an embodiment, forwarding database (FDB) maintenance module 516 can maintain a forwarding database (FDB) within kernel space of the network security operating system of the network security device to store a mapping between the application configured on the VDOM to its corresponding sub-interface by automatically learning attributes of packets communicated between the application and the external network device via the sub-interface and storing the learned attributes in the FDB. For example, a source MAC address of the packet can be stored in the FDB and associated with the sub-interface through which the packet is being forwarded. Further, the FDB can also store and maintain parameters pertaining to the sub-interfaces and, their respective association with the parent interface and their respective association with a particular VDOM. For example, the FDB can store the MAC address of a sub-interface and the MAC address of the associated parent interface.

In an embodiment, forwarding database (FDB) maintenance module 516 can perform learning of the attributes of the sub-interface when the network security device is operating in transparent mode. During operation in transparent mode, at least one FDB entry can store information mapping a source MAC address of pass-through traffic and the sub-interface on which the pass-through traffic is received. Also, before storing entries in the FDB, the entries can be hashed by MAC address of the respective sub-interface such that the entry can be stored in a forwarding hash table. Further details regarding forwarding database (FDB) maintenance module 516 is provided below with reference to FIGS. 8, 9 and 11B.

In the context of an HA cluster including a primary virtualized network device (primary unit) and at least one secondary virtualized network security device (secondary unit), those skilled in the art will appreciate that FDB maintenance module 516 maintains the FDB in the primary unit. Therefore, when an internal switch running on the primary unit receives a packet via a sub-interface of the parent interface, FDB maintenance module 516 can cause a first FDB stored within a kernel space of a first network security operating system running on the primary unit to learn or update an association between a source MAC address of the packet and the sub-interface. Further, an entry containing the source MAC address of the packet and information regarding the sub-interface can be stored in the first FDB.

In an embodiment, FDB synchronization module 518 can perform real-time synchronization of the first FDB and a second FDB maintained by a secondary unit of the HA cluster. The second FDB can be maintained within a kernel space of a second network security operating system running on the secondary unit. FDB synchronization module 518 can provide synchronization when responsive to certain trigger events, including when FDB entries are learned by the first FDB, when FDB entries expire in the second FDB and when a new secondary unit joins the HA cluster. In this manner, the FDB maintained by each secondary unit remains synchronized with that of the primary unit so that when an HA failover occurs; any secondary unit can take up the functionality of the primary unit for seamless processing of network traffic.

FDB synchronization module 518 can initiate a synchronization when an entry is created or updated in the first FDB. User spaces of the first network security operating system and the second network security operating system can include a first synchronization unit and a second synchronization unit respectively. The first synchronization unit and the second synchronization unit can comprise a daemon that is a type of program that can run in the background waiting to be activated by the occurrence of a specific event or condition. During the process of synchronization, information regarding the entry from the first FDB maintained within the kernel space of the first network security operating system can be transferred to the first synchronization unit. Such transfer of information from the kernel space to the user space of the first network security operating system can be performed via a first interprocess communication (IPC) interface that can include a first netlink socket established between a process in the kernel space of the first network security operating system and the first synchronization unit. Further, when the first synchronization unit receives information regarding the entry, the first synchronization unit can cause the second FDB to be updated by transmitting the information regarding the entry to the second synchronization unit. Such transfer of information from the first synchronization unit to the second synchronization unit can be performed via a host-to-host communication service that can include a TCP/UDP socket established between the first synchronization unit and the second synchronization unit. The entry can then be updated in the second FDB using a system call that can include an ioctl system call.

FDB synchronization module 518 also performs synchronization when an entry in the second FDB expires. When an entry in the second FDB expires, the expired entry can be removed from the second FDB. Further, information regarding the expired entry can be transferred from the kernel space of the second network security operating system to the second synchronization unit via a second IPC interface of the second network security operating system that can include a second netlink socket established between a process in the kernel space of the second network security operating system and the second synchronization unit. The second synchronization unit can request information regarding a corresponding entry to the expired entry from the first FDB by issuing a query to the first synchronization unit. The query can be issued via the host-to-host communication service to determine whether the expired entry has also expired within the first FDB. When the determining is negative (i.e., the expired entry has not expired in the first FDB), then information regarding the corresponding entry can be transmitted to the second synchronization unit via the host-to-host communication service such that the corresponding entry can be added to the second FDB. Information regarding the corresponding entry can be transmitted to the second FDB by following a similar path as described in context of synchronization when an entry is created or updated in the first FDB.

FDB synchronization module 518 also performs synchronization responsive to an additional secondary virtualized network security device (additional secondary unit) joining the HA cluster. When an additional secondary unit joins the HA cluster, a message requesting entries associated with a particular virtual domain (VDOM) associated with the HA cluster can be received by the first FDB via the host-to-host communication service. In response to the message, for each VDOM entry of the entries the first synchronization unit can transfer a request for the VDOM entry to the kernel space of the first network security operating system via a system call of the first network security operating system that can include ioctl system call. Further, the VDOM entry can be synchronized to an FDB maintained by the additional secondary unit by transferring information regarding the VDOM entry to a third synchronization unit running in a user space of a third network security operating system running on the additional secondary virtualized network security device. Information regarding the VDOM entry can be transferred to the FDB forwarding database maintained by the additional secondary unit by following a similar path as described in context of synchronization when an entry is created or updated in the first FDB.

FIGS. 6A and 6B are code fragments 600 and 650, respectively, illustrating exemplary implementation details relating to sub-interface creation in accordance with an embodiment of the present invention.

In an embodiment, the parent interface which can be a physical interface, an aggregate interface, or a VLAN interface, can have zero or more associated sub-interfaces. An object of the type "macvlan_port" can be allocated and associated with the parent interface as illustrated in FIG. 6A. In "the macvlan_port" object, the "count" field is used to maintain a count of the number of sub-interfaces that currently exist for the parent interface. The maximum number of sub-interfaces that can be created for a parent physical interface can be limited by a predefined "MACVLAN_MAX_ NUM" value. In the context of the present example, "MACVLAN_ MAX_ NUM" set to 512. In an embodiment, when a sub-interface for a particular parent interface is deleted, the "count" field within the macvlan_port object for the particular parent interface can be decreased by one, such that when all sub-interfaces of the parent interface are deleted, the "macvlan_port" object of the physical interface can be freed. Thus, when the "count" field becomes zero, the "macvlan_port" object can be freed. Also a "bitmap" field can be used to allocate the smallest non-negative available integer to a sub-interface as a unique identifier for that sub-interface. As sub-interfaces are created and deleted for a particular physical interface, the bitmap can be updated to reflect the unavailability/availability of the unique identifier for use. Furthermore, fields "macvlan_mac_lock", "mac_num", "mac hash", and "mac_gc_timer" can be used to maintain FDB by FDB maintenance module 516. The "mac_hash" field can pertain to a hash table such that every FDB entry can be linked in the hash table with MAC address of the respective sub-interface. The "mac_num" field can indicate total number of currently existing FDB entries in the hash table and "mac_gc_timer" field can indicate a timer, which can run periodically to obsolete the stale FDB entries.

When a sub-interface is created for an interface, an object type "macvlan_dev" can be created, as illustrated in FIG. 6B and associated with the "macvlan_port" object for that interface. The "macvlan_dev" object can be allocated as private information of corresponding net device. The "macvlan_dev" object can be assigned the smallest non-negative available interface as a unique identifier, which can be saved in "macvlan_id" field. Further, if the sub-interface is going to work in a transparent VDOM, the field "learn_mac" can be set to 1.

Figure 7:
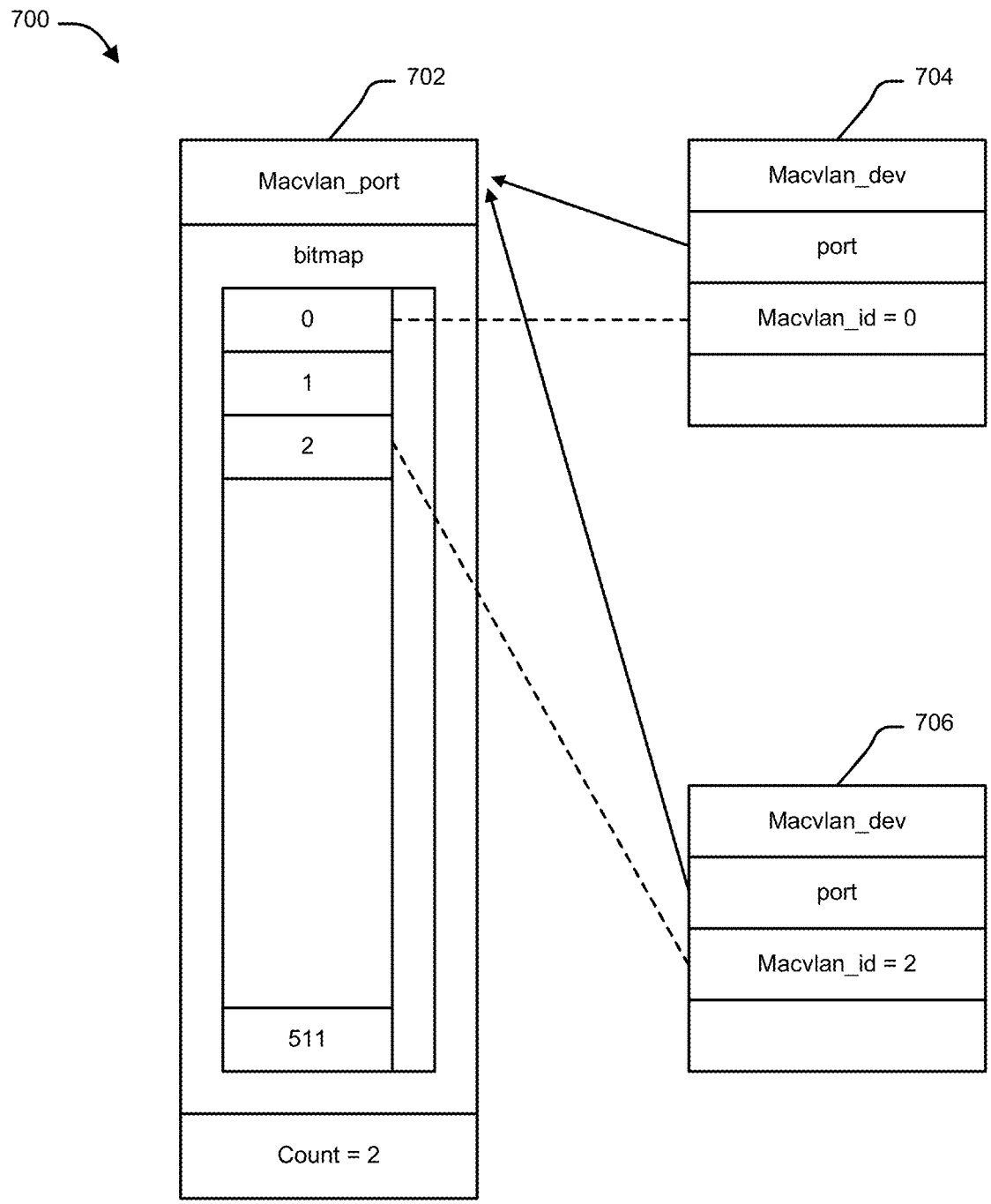
FIG. 7 is a block diagram illustrating the relationship between ports and instantiated objects of one or more sub-interfaces in accordance with an embodiment of the present invention.

FIG. 7 is a block diagram 700 illustrating the relationship between ports and instantiated objects of one or more sub-interfaces in accordance with an embodiment of the present invention.

As illustrated in FIG. 7, the "bitmap" field of a macvlan_port object 702 of the parent interface is used to provide a unique identifier "macvlan_id" to objects of sub-interfaces 704 and 706. Sub-interfaces 704 and 706 also include port information of the parent interface 702 with which they are associated.

In an embodiment, during creation of a sub-interface, system 500 can return an error if the name of the sub-interface is already in use. System 500 can allocate an object of type "macvlan_port" if no sub-interface currently exists for the parent physical interface (the lower interface) and a first sub-interface is required to be created. System 500 can also return an error in case the total number of such sub-interface of the parent physical interface has already reached the upper limit. During creation of the sub-interface, system 500 can allocate the smallest non-negative identifier available in the bitmap field to the "macvlan_id" of the sub-interface as described below:

```
vlan→macvlan_id=find_first_zero_bit (port->bitmap,
    MACVLAN_MAX_NUM)
```

While various other approaches may be used to generate a unique MAC address for a new EMACVLAN sub-interface based on the parent interface's MAC address and the unique ID of the EMACVLAN sub-interface, an exemplary technique for generation of a unique 6-byte MAC address for the sub-interface is as follows:

```
new_mac[0]=lower_mac[0]|0x02; /* set local assign-
    ment bit (IEEE802)*/ new_mac[0]=lower_mac[0]+((vlan->macvlan_id+
    1)<<2);

new_mac[1]=lower_mac[1]+((vlan->macvlan_id+
    1)>>6);

new_mac[2]=lower_mac[2]

new_mac[3]=lower_mac[3];

new_mac[4]=lower_mac[4];

new_mac[5]=lower_mac[5];
```

In the above example, the lower_mac byte array represents the MAC address of the parent interface and, upon completion; the new_mac byte array contains the newly generated unique MAC address for the sub-interface based on both the unique ID of the sub-interface and the MAC address of the parent interface. Once the sub-interface has been created, the sub-interface can be registered and linked into the list of sub-interfaces of the parent interface.

FIG. 8 is a code fragment 800 illustrating an exemplary data structure for a forwarding database entry in accordance with an embodiment of the present invention.

As noted above, in embodiments of the present invention, zero or more sub-interfaces can be created for the same underlying interface of a network security device, with each sub-interface having its own unique MAC address. When the network security operating system of the network security device is operating in transparent mode, a forwarding database (FDB) is maintained in kernel space of the network security operating system to cache various learned source MAC addresses for the sub-interfaces when traffic passes through the sub-interfaces. This allows the FDB to be used by the network security device to make traffic forwarding decisions regarding on which sub-interface traffic received on the parent interface should be forwarded.

In the context of the example illustrated in FIG. 8, each FDB entry is represented by an object of type "macvlan_fdb_entry", which includes a "mac_type" filed that can be "dynamic", "static", or "local". When value of the "mac_type" field is "dynamic", it means the FDB entry was learned based on observed traffic; when the value of the "mac_type" field is "static", it means the FDB entry was set from a user-space; and when the value of the "mac_type" field is "local", it means that the MAC address belongs to a corresponding sub-interface. FDB entries can be hashed by the MAC address of the respective sub-interface such that searching of the requisite entry can be performed more efficiently. In one embodiment, "local" entries can have the highest priority and "dynamic" entries have the lowest priority.

Figure 9:
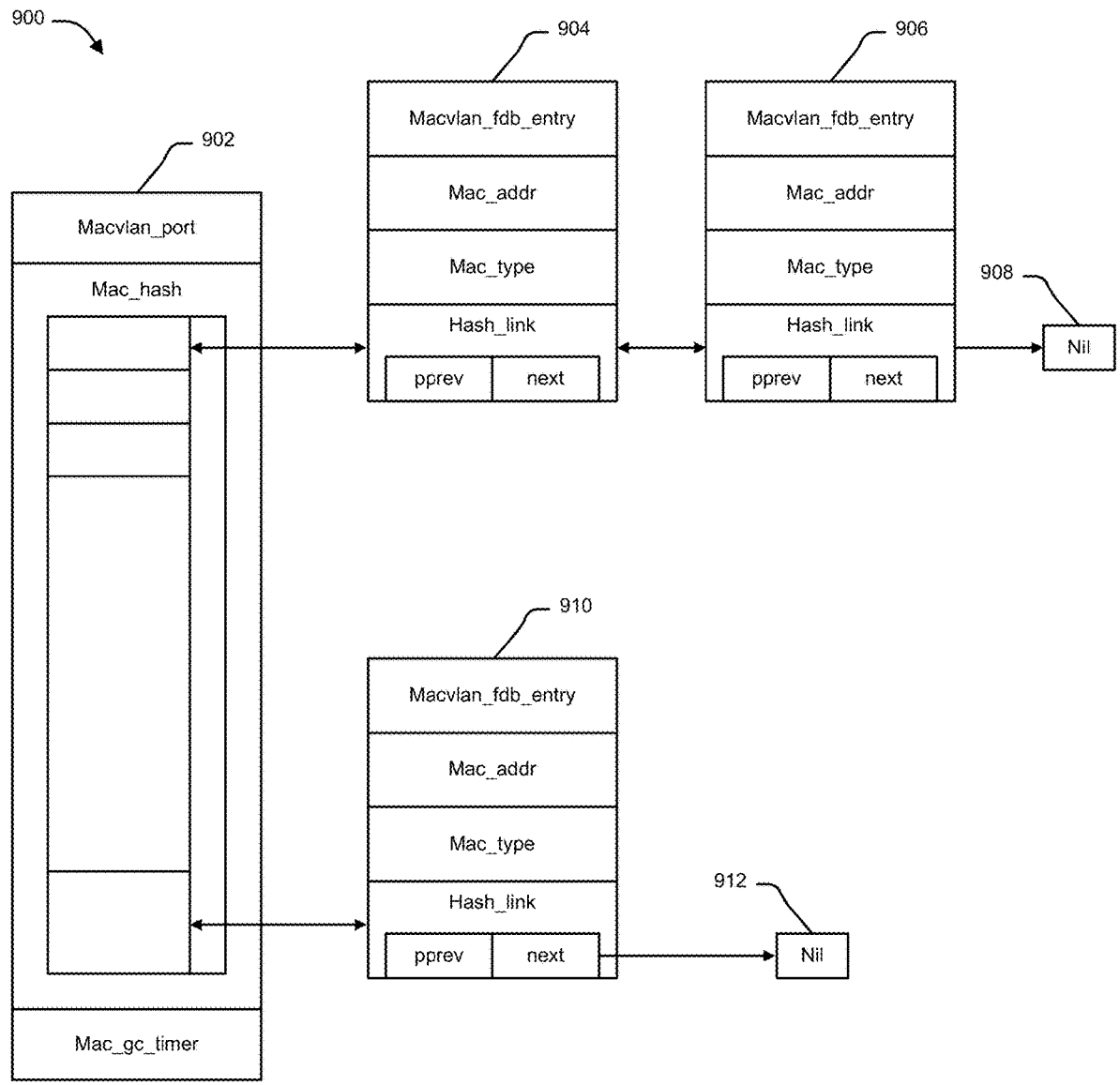
FIG. 9 is a block diagram conceptually illustrating how entries of a forwarding database are created and managed in accordance with an embodiment of the present invention.

FIG. 9 is a block diagram 900 conceptually illustrating how entries of a forwarding database are created and managed in accordance with an embodiment of the present invention.

Referring to FIG. 8 and FIG. 9, in an object associated with the parent interface, i.e., "macvlan_port", object 902, fields "mac_hash" and "mac_gc_timer" can be used to maintain FDB by the FDB maintenance module 516. When a packet passes through a sub-interface, an FDB entry can be created or updated with the source MAC address of the packet and information identifying the sub-interface. The entries in the FDB can be hashed by the MAC address of the respective sub-interface. When a packet is received on a physical interface having one or more sub-interfaces, the FDB can be used to determine on which sub-interface to forward the packet by performing a look up against the FDB with the destination MAC address of the packet. If an FDB entry is found, the "last_used" field can be updated to reflect the current time. Further, a timer function can run periodically to remove old FDB entries that have not been used for a predetermined and/or configurable time period (e.g., MACVLAN_FDB_TIMEOUT). In an example, MACVLAN_FDB_TIMEOUT can be set to 1 hour.

Figure 10A:
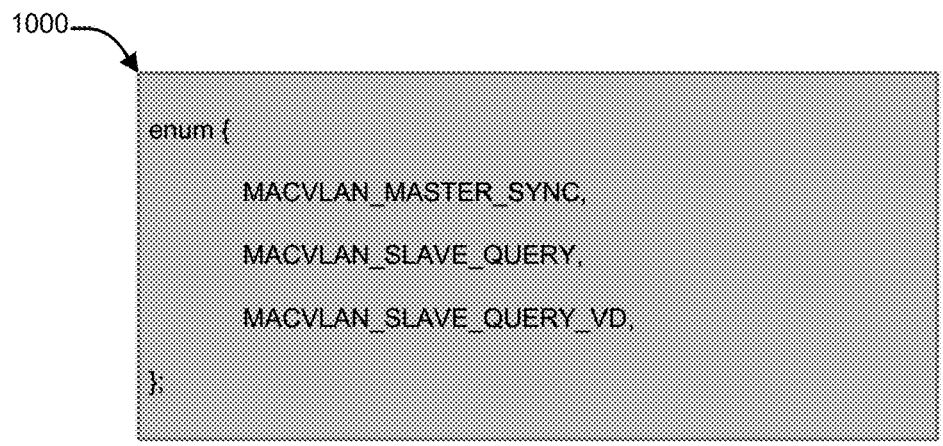
FIG. 10A is a code fragment illustrating the definition of three message types used to exchange information between a primary HA cluster unit and a secondary HA cluster unit in accordance with an embodiment of the present invention.

FIG. 10A is a code fragment 1000 illustrating the definition of three message types used to exchange information between a primary HA cluster unit and a secondary HA cluster unit in accordance with an embodiment of the present invention.

In context of the present example, the communication between a primary unit and a secondary unit can be facilitated via a host-to-host communication service. Message "MACVLAN_MASTER_SYNC" can be used by the primary unit to synchronize a new FDB entry, or an updated FDB entry to the secondary unit. Message "MACVLAN_SLAVE_QUERY" can be used by a secondary unit to request an FDB entry from primary unit. Message "MACVLAN_SLAVE_QUERY_VD" can be used by a secondary unit request all FDB entries associated with a specified VDOM from the primary unit.

Figure 10B:
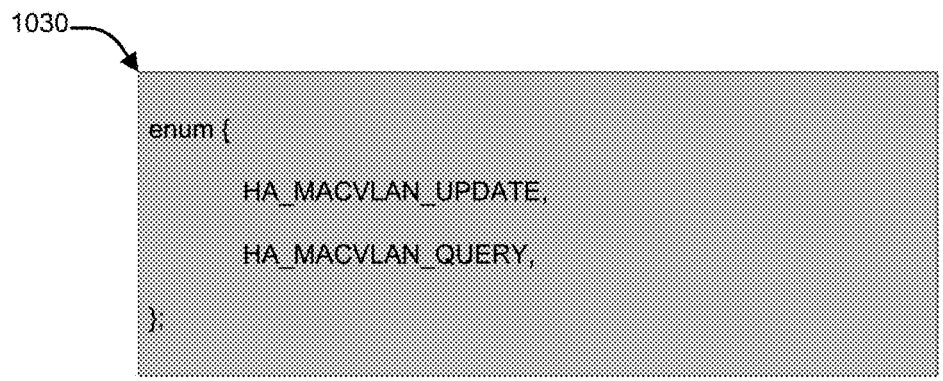
FIG. 10B is a code fragment illustrating the definition of two message types used to communicate information from kernel space to user space regarding changes made to an EMACVLAN FDB maintained by a primary cluster unit in accordance with an embodiment of the present invention.

FIG. 10B is a code fragment 1030 illustrating the definition of two message types used to communicate information from kernel space to user space regarding changes made to an EMACVLAN FDB maintained by a primary cluster unit in accordance with an embodiment of the present invention.

In context of the present example, the transfer of data from kernel space to user space in the primary unit can be performed via an IPC interface. Messages "HA_MACVLAN_UPDATE" and "HA_MACVLAN_QUERY" can be defined and used by kernel space of the first network security operating system to notify the first synchronization unit in the user space of the first network security operating system about a new FDB entry, an updated FDB entry, or/and an expired FDB entry. Similar messages can be defined for transfer of data from kernel space to user space in the secondary unit.

Figure 10C:
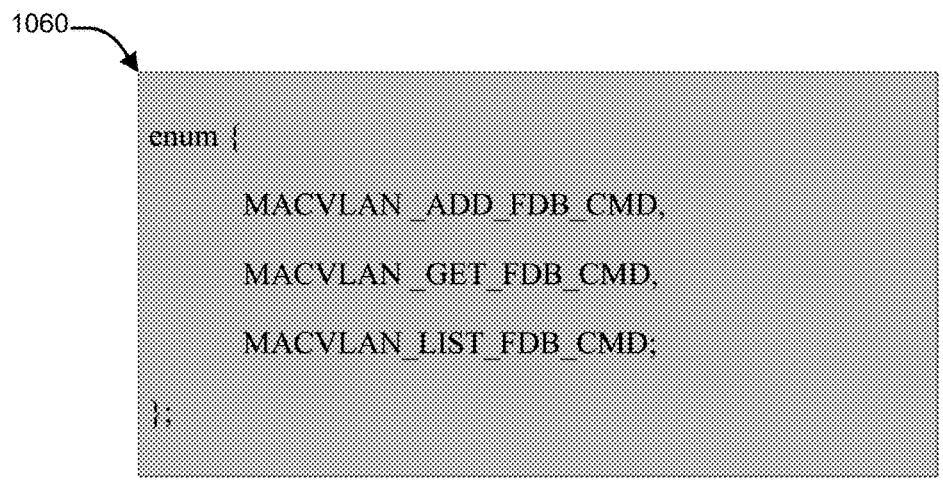
FIG. 10C is a code fragment illustrating the definition of three message/command types used by user space to add an entry to or retrieve one or more entries from an EMACVLAN FDB maintained in kernel space of a standalone unit or an HA cluster unit in accordance with an embodiment of the present invention.

FIG. 10C is a code fragment illustrating the definition of three message/command types used by user space to add an entry to or retrieve one or more entries from an EMACVLAN FDB maintained in kernel space of a standalone unit or an HA cluster unit in accordance with an embodiment of the present invention.

In context of the present example, the transfer of data from user space to kernel space in the secondary unit can be performed via a system call. As illustrated, messages "MACVLAN_ADD_FDB_CMD", "MACVLAN_GET_FDB_CMD", and "MACVLAN_LIST_FDB_CMD"" can be defined and used by user space to add/retrieve a single FDB entry, or list all related FDB entries in kernel space of a second synchronization unit running within the user space of the second network security operating system. Similar messages can be defined for transfer of data from user space to kernel space in the secondary unit.

Referring to FIGS. 10A-C, in an example, when traffic or packets pass through a parent interface in the primary unit, when the source MAC address of a packet is determined not to exist in the first FDB of the primary unit, an association between the source MAC address of the packet and the sub-interface is cached as a new entry in the first FDB. Alternatively, when the source MAC address has a corresponding entry in the first FDB, but the source MAC address is paired with a different sub-interface, the corresponding entry is updated in the first FDB. Additionally, responsive to the FDB update, the kernel space of the primary unit transfers an "HA_MACVLAN_UPDATE" netlink message to the first synchronization unit of the primary unit. Upon receiving the message, the first synchronization unit forms a "MACVLAN_MASTER_SYNC" message and broadcasts to its counterpart in one or more secondary units. Further, the received FDB entry at the secondary unit can be written into the FDB maintained within kernel space by the "MACVLAN_ADD_FDB_CMD" ioctl system call.

In one embodiment, when an entry in a second FDB of the secondary unit expires, the entry is removed from the second FDB. Further, responsive to the change to the second FDB, the kernel space of the secondary unit transfers an "HA_MACVLAN_QUERY" netlink message to second synchronization unit of the secondary unit. Upon receiving the message, the second synchronization unit forms a "MACVLAN_SLAVE_QUERY" message and transfers the message to its counterpart in the primary unit. When the queried entry has also expired in the primary unit, the query message can be ignored; however, if the queried entry has not expired in the primary unit, the first synchronization unit can retrieve the corresponding FDB entry from kernel space of the primary unit by the "MACVLAN_GET_FDB_CMD" ioctl system call. The ioctl system call message can be included into a "MACVLAN_MASTER_SYNC" message so that it can be sent to the secondary unit.

In one embodiment, when a new secondary unit/additional secondary unit that is additional secondary virtualized network security device joins the HA cluster, the synchronization unit of the additional secondary unit forms a "MACVLAN_SLAVE_QUERY_VD" message for each VDOM working in the HA cluster, and sends the message to the primary unit. Once the message is received at the primary side, the "MACVLAN_LIST_FDB_CMD" ioctl system call is made for each sub-interface in the specified VDOM, and each retrieved entry is synchronized back to the additional secondary unit through a "MACVLAN_MASTER_SYNC" message.

Figure 11A:
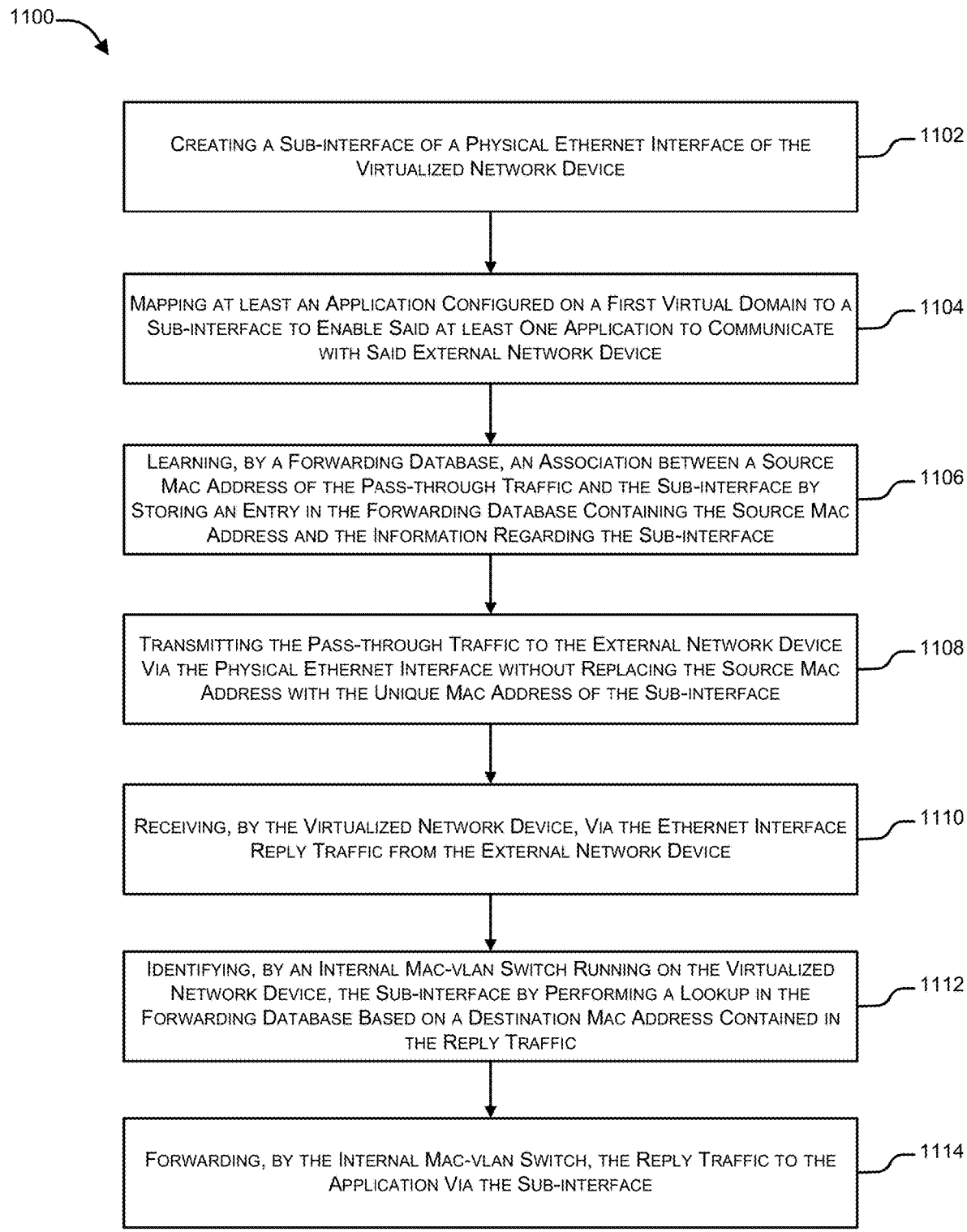
FIG. 11A is a high-level flow diagram illustrating configuration of the sub-interfaces for facilitating communication between an application associated with a virtual domain and an external network device in accordance with an embodiment of the present invention.

FIG. 11A is a high-level flow diagram 1100 illustrating configuration of the sub-interfaces for facilitating communication between an application associated with a virtual domain and an external network device in accordance with an embodiment of the present invention.

In the context of the present example, at block 1102, a virtualized network device creates one or more sub-interfaces associated with a physical Ethernet interface (parent interface) of the virtualized network device to facilitate communication between an application associated with a first VDOM of the virtualized network device and an external network device. The one or more sub-interfaces of a parent interface are each assigned a unique MAC address based on the locally unique ID of the sub-interface and the MAC address of the parent interface as described above.

At block 1104, the application (e.g., performing one or more security functions) configured on a first VDOM can be mapped (bound) to a first sub-interface.

At block 1106, FDB learning is performed to allow reply traffic to be directed to the application when the VDOM is operating in transparent mode. For example, when the internal MAC-VLAN switch of the network security device receives a packet via a sub-interface it may create or update an FDB entry within an FDB maintained in kernel space of the network security operating system of the network security device to create an association between the source MAC address of the packet and the sub-interface as described further below with reference to FIG. 11B. In this manner, reply traffic will be properly forwarded through the first VDOM and processed by the application on the reverse path.

At block 1108, the virtualized network device can transmit the pass-through traffic to the external network device via the parent interface without replacing the source MAC address with the unique MAC address of the sub-interface.

At block 1110, the virtualized network device can receive reply traffic from the external network device via the parent interface. The reply traffic has a source MAC address associated with the external network device and a destination MAC address that was previously learned in block 1106 to be associated with the first sub-interface.

At block 1112, the internal MAC-VLAN switch running on the virtualized network device can identify the sub-interface to which the reply traffic is to be forwarded by performing a lookup in the FDB based on the destination MAC address contained in the reply traffic.

At block 1114, the internal MAC-VLAN switch forwards the reply traffic to the application via the sub-interface based on an FDB entry found by the FDB lookup.

Figure 11B:
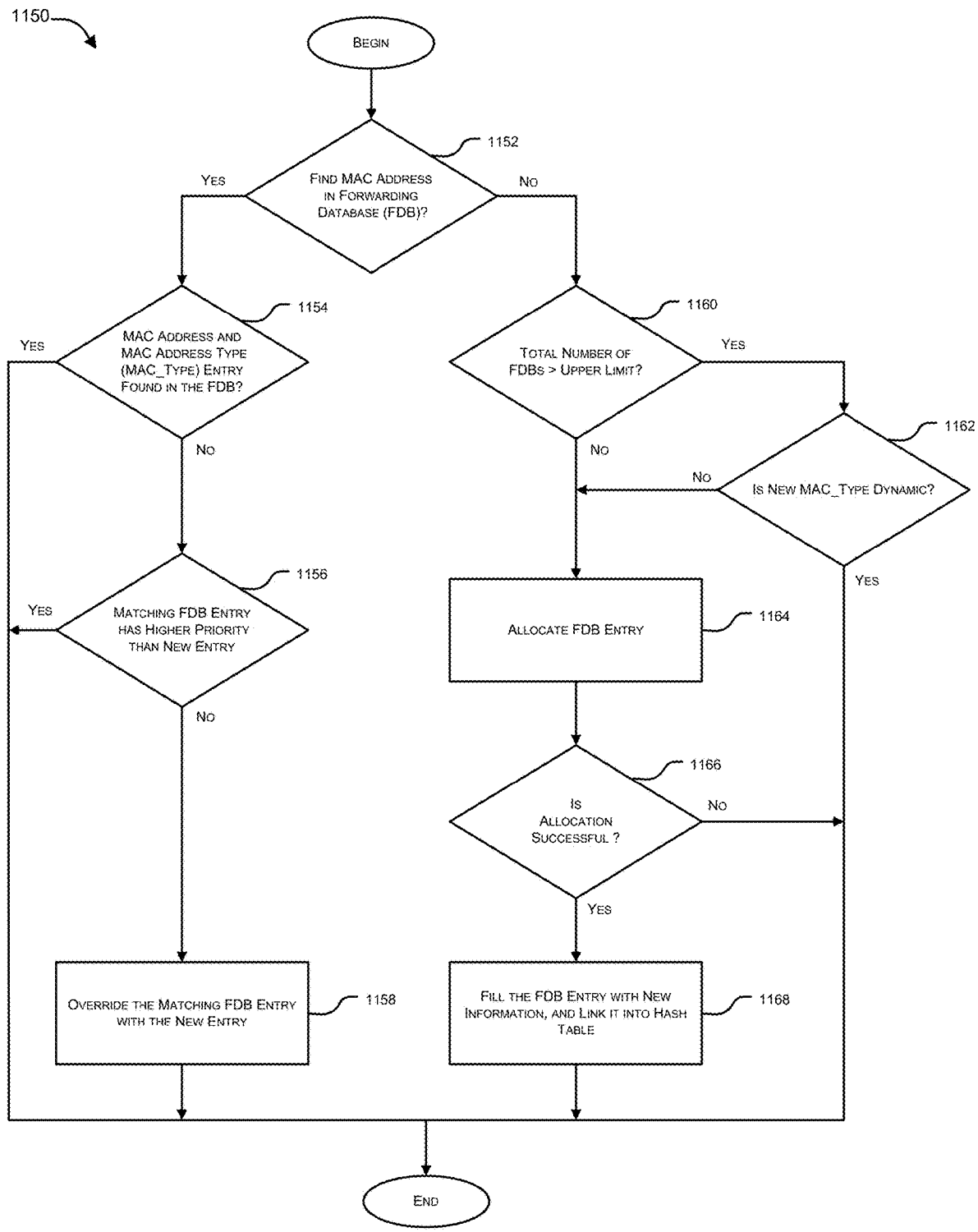
FIG. 11B is a flow diagram illustrating forwarding database learning processing in accordance with an embodiment of the present invention.

FIG. 11B is a flow diagram 1150 illustrating forwarding database learning processing in accordance with an embodiment of the present invention.

In the context of the present example, responsive to receipt of a packet by the internal MAC-VLAN switch via a sub-interface, FDB insertion processing may be performed (e.g., by invoking FDB maintenance module 516 with information identifying the VLAN at issue, the source MAC address of the packet and the MAC address type). At decision block 1152, an FDB lookup is performed against the FDB based on the MAC address. If the lookup finds a matching FDB entry, then an FDB entry associating this MAC address with a sub-interface already exists in the FDB. When a matching FDB entry is found, then processing continues with decision block 1154; otherwise, if no matching FDB entry is found, then processing branches to decision block 1160.

At decision block 1154, it is further determined whether the VLAN and the MAC address type (e.g., the "mac_type" field) matches the FDB entry found in decision block 1152. When these attributes are the same, the processing is complete and no changes need to be made to the FDB entry; otherwise, processing continues with decision block 1156. At decision block 1156, it is determined whether the found FDB entry has a higher priority than that of the FDB entry attempting to be added pertaining to the received MAC address. If the found FDB entry has a lower priority, the FDB entry can be overridden by the new entry at block 1158; otherwise, processing is complete.

When the source MAC address of the packet is not found in the FDB at decision block 1152, then, at decision block 1160, new FDB entry creation processing begins by determining whether the current number of learned FDB entries is greater than the upper limit of learned FDB entries allowed. If so, then processing branches to decision block 1162; otherwise processing continues with block 1164.

At decision block 1162, it is determined whether the MAC address type (e.g., the "mac_type" field) for the new entry is dynamic. If so, then processing is complete as no further learned FDB entries are permitted; otherwise, since, this is not a learned FDB entry, processing continues with block 1164.

At block 1164, an FDB entry is allocated. At decision block 1166, it is determined whether the allocation was successful at 1166. If so, then processing continues with block 1168; otherwise, processing is complete and no new FDB entry is created.

At block 1168, the newly allocated FDB entry is filled with the new information and linked to the hash table (e.g., mac_hash of macvlan_port object 902 of FIG. 9).

Those skilled in the art will appreciate, in the context of an HA cluster including a primary unit and a secondary unit, the processing described with reference to FIGS. 11A and 11B is performed by the primary unit.

Figure 12A:
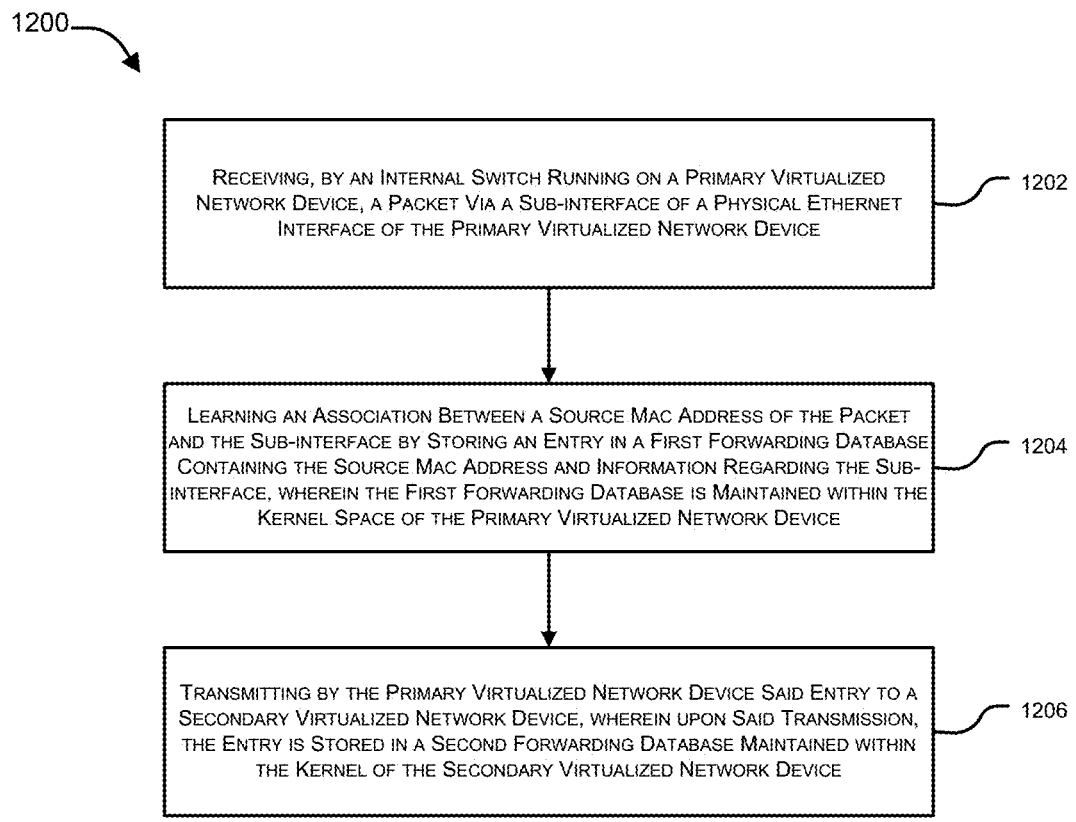
FIG. 12A is a high-level flow diagram illustrating synchronization processing between a primary cluster unit and a secondary cluster unit in accordance with an embodiment of the present invention.

FIG. 12A is a high-level flow diagram 1200 illustrating synchronization processing between a primary cluster unit and a secondary cluster unit in accordance with an embodiment of the present invention.

In context of the present example, where a primary unit and a secondary unit are part of an HA cluster, at block 1202, an internal switch running on the primary unit receives a packet via a sub-interface of a physical Ethernet interface of the primary unit.

At block 1204, an association between a source MAC address of the packet and the sub-interface can be learned or updated by a first FDB maintained by the primary unit within a kernel space of a first network security operating system running on the primary unit by storing an entry containing the source MAC address and information regarding the sub-interface in the first FDB.

At block 1206, real-time synchronization of the first FDB and a second FDB database is performed. The second FDB is maintained by the secondary unit within a kernel space of a second network security operating system running on the secondary unit. During the process of synchronization, information regarding the entry from the kernel space of the first network security operating system can be transferred to the first synchronization unit via a first IPC interface. Further, when the first synchronization unit receives information regarding the entry, the first synchronization unit can cause the second FDB to be updated by transmitting the information regarding the entry to the second synchronization unit via a host-to-host communication service.

Figure 12B:
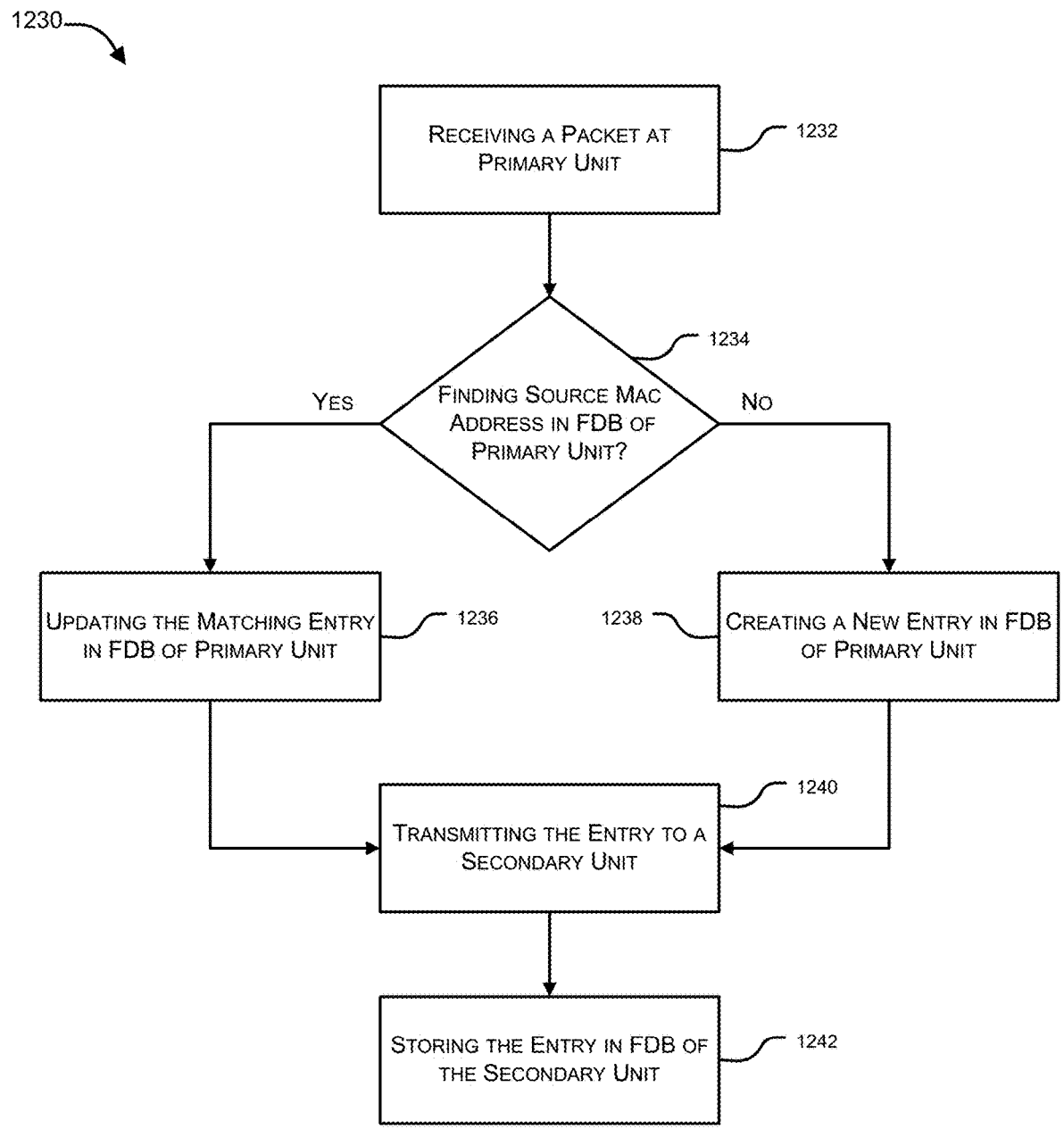
FIG. 12B is a flow diagram illustrating synchronization processing resulting from creation of a new entry or updating an existing entry within an EMACVLAN FDB maintained by a primary cluster unit in accordance with an embodiment of the present invention.

FIG. 12B is a flow diagram 1230 illustrating synchronization processing resulting from creation of a new entry or updating an existing entry within an EMACVLAN FDB maintained by a primary cluster unit in accordance with an embodiment of the present invention.

In context of the present example, at block 1232, an internal switch running on the primary unit receives a packet via a sub-interface of a parent interface. In response to receiving, at decision block 1234, FDB maintenance module 516 can find source MAC address of the packet in FDB of the primary unit. If the source MAC address is found, at block 1236, the corresponding entry can be updated in the FDB of the primary unit. On contrary, if the source MAC address is not found, at block 1238, a new entry can be created corresponding to the source MAC address in the FDB of the primary unit.

At block 1240, FDB synchronization module 518 can perform synchronization of the FDB of the primary unit and the secondary unit by transmitting the newly created or updated entry to the secondary unit. At block 1242, the transmitted entry can be stored in the FDB of the secondary unit.

Figure 12C:
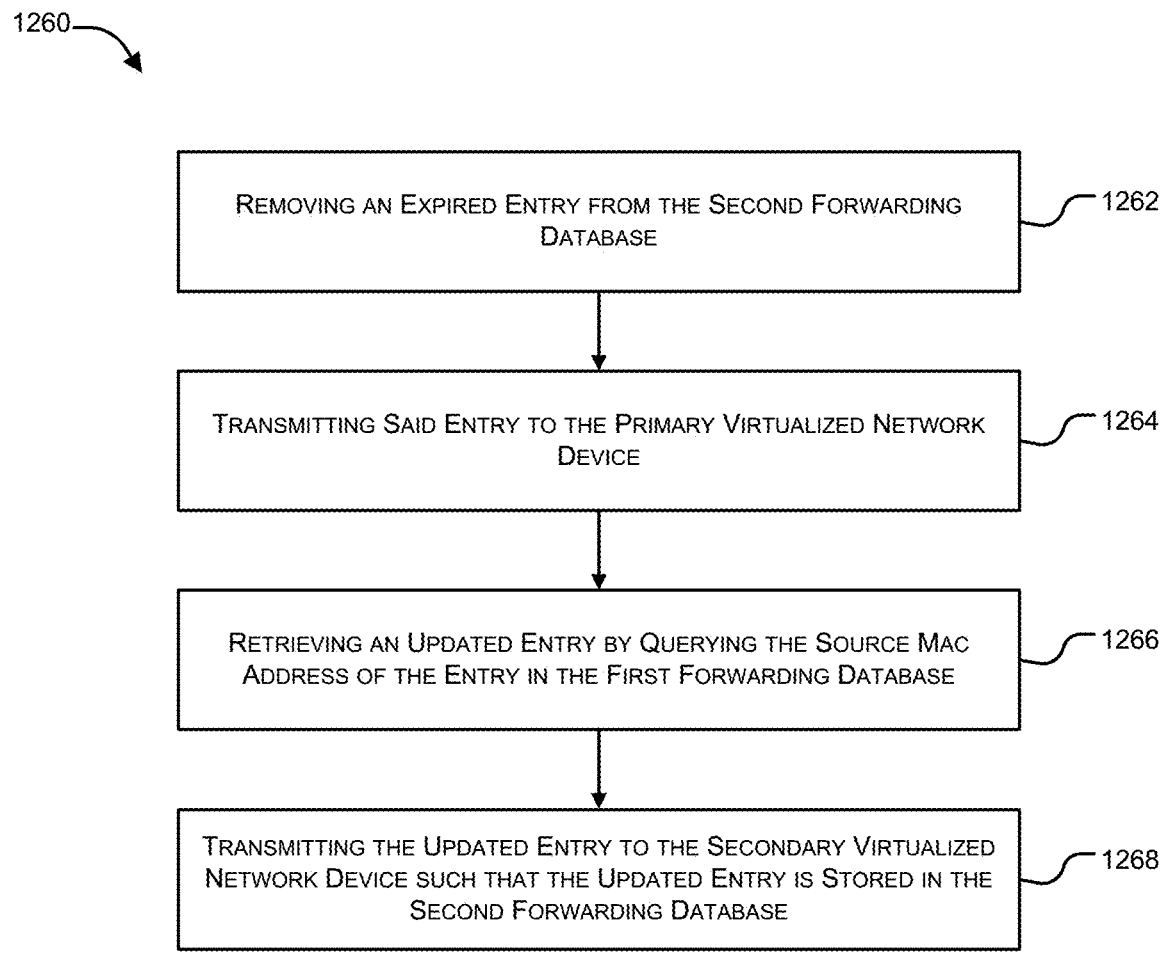
FIG. 12C is a flow diagram illustrating synchronization processing resulting from expiration of an entry of an EMACVLAN FDB maintained by a secondary cluster unit in accordance with an embodiment of the present invention.

FIG. 12C is a flow diagram 1260 illustrating synchronization processing resulting from expiration of an entry of an EMACVLAN FDB maintained by a secondary cluster unit in accordance with an embodiment of the present invention.

In context of the present example, at block 1262, when an entry in FDB of a secondary unit is expired, the entry can be removed from the FDB of the secondary unit. At block 1264, information regarding the expired entry can be transmitted to the primary unit by transferring information regarding the expired entry from the kernel space of the secondary unit to synchronization unit of the secondary unit via a second IPC interface, and by issuing a query to the first synchronization unit via the host-to-host communication service.

At block 1266, it can be determined whether the expired entry has also expired within the forwarding database of the primary unit by querying the source MAC address in the FDB of the primary unit. If the entry is not expired in the FDB of the primary unit, at block 1268, corresponding entry i.e. updated entry can be transmitted from the primary unit to the secondary unit via host-to-host communication service such that the corresponding entry can be added to the FDB of the secondary unit.

Figure 12D:
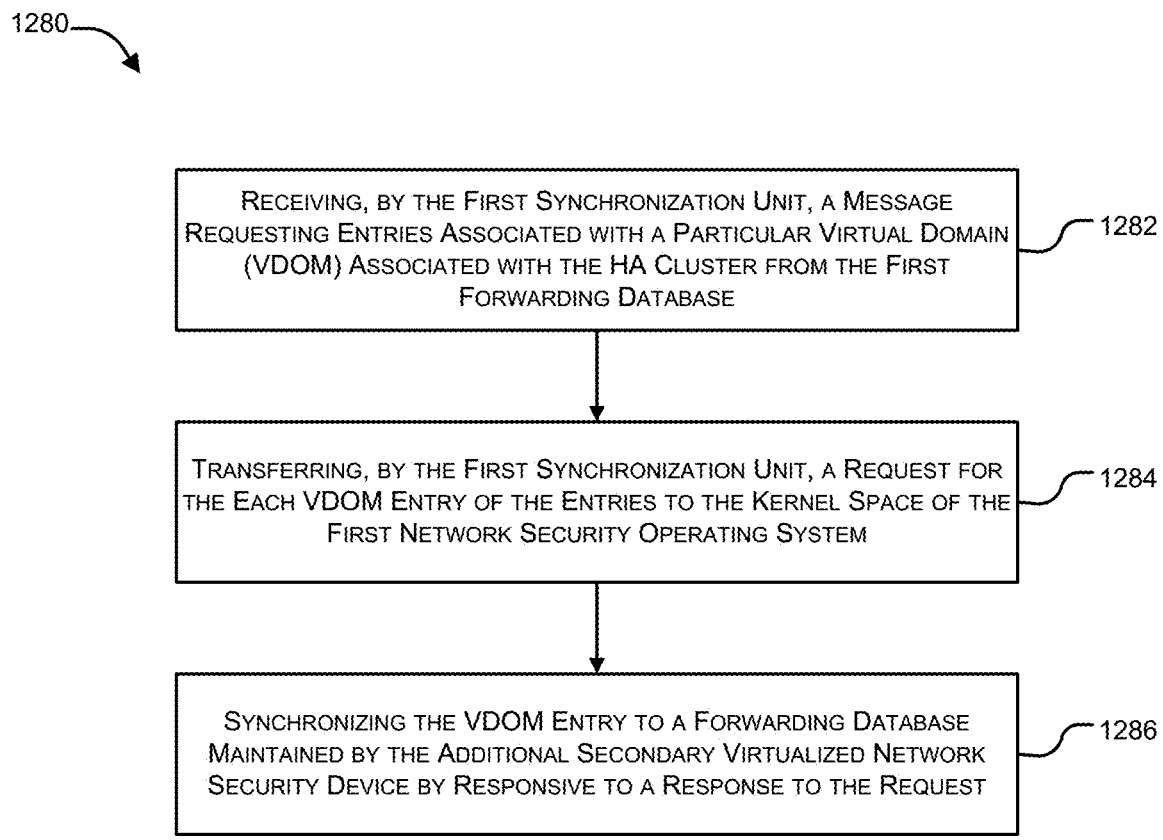
FIG. 12D is a flow diagram illustrating synchronization processing resulting from a new secondary cluster unit joining the HA cluster in accordance with an embodiment of the present invention.

FIG. 12D is a flow diagram 1280 illustrating synchronization processing resulting from a new secondary cluster unit joining the HA cluster in accordance with an embodiment of the present invention.

When a new secondary unit (additional secondary unit) joins the HA cluster, at block 1282, the synchronization unit of the primary unit receives a message requesting entries from the first FDB associated with a particular virtual domain (VDOM) associated with the HA cluster. The message can be communicated from the synchronization unit of the additional secondary unit to the synchronization unit of the primary unit via the host-to-host communication service.

At block 1284, responsive to the message, for each VDOM entry of the entries, a request for the VDOM entry can be transferred by the synchronization unit of the primary unit to the kernel space of the network security operating system running on the primary unit.

At block 1286, the VDOM entry can be synchronized to an FDB maintained by the additional secondary unit by transferring information regarding the VDOM entry to a synchronization unit running in a user space of a network security operating system running on the additional secondary virtualized network security device.

Figure 13:
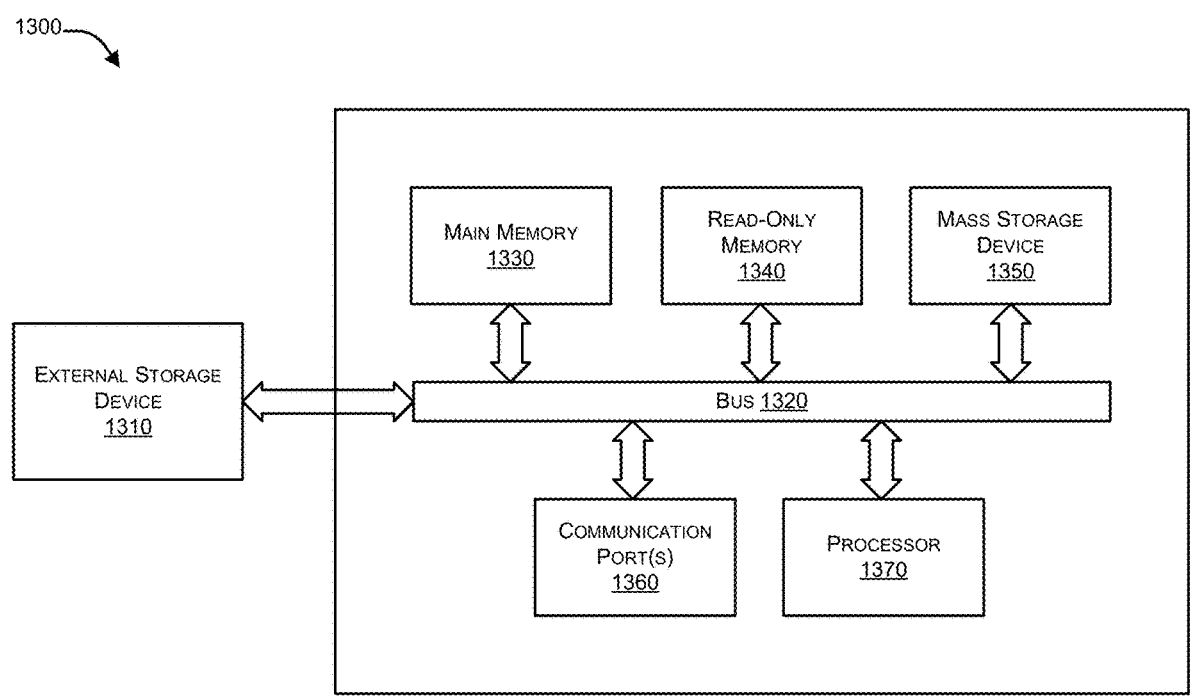
FIG. 13 illustrates an exemplary computer system in which or with which embodiments of the present invention may be utilized.

FIG. 13 illustrates an exemplary computer system 1300 in which or with which embodiments of the present invention may be utilized. Computer system 1300 may represent some portion of a network security device (e.g., network security device 150 or 302), a network gateway (e.g., one of network gateways 115), an HA primary cluster unit (e.g., primary unit 406 or 452), an HA secondary cluster unit (e.g., secondary unit 408 or 466) or system 500.

As shown in FIG. 13, computer system 1300 includes an external storage device 1310, a bus 1320, a main memory 1330, a read only memory 1340, a mass storage device 1350, communication port 1360, and a processor 1370.

Those skilled in the art will appreciate that computer system 1300 may include more than one processor 1370 and communication ports 1360. Examples of processor 1370 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1370 may include various modules associated with embodiments of the present invention.

Communication port 1360 can be any of an RS-232 port for use with a modem based dialup connection, a 10/100 Ethernet port, a Gigabit or 10 Gigabit port using copper or fiber, a serial port, a parallel port, or other existing or future ports. Communication port 1360 may be chosen depending on a network, such a Local Area Network (LAN), Wide Area Network (WAN), or any network to which computer system connects.

Memory 1330 can be Random Access Memory (RAM), or any other dynamic storage device commonly known in the art. Read only memory 1340 can be any static storage device(s) e.g., but not limited to, a Programmable Read Only Memory (PROM) chips for storing static information e.g. start-up or BIOS instructions for processor 1370.

Mass storage 1350 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1320 communicatively couples processor(s) 1370 with the other memory, storage and communication blocks. Bus 1320 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1370 to software system.

Optionally, operator and administrative interfaces, e.g. a display, keyboard, and a cursor control device, may also be coupled to bus 1320 to support direct operator interaction with computer system. Other operator and administrative interfaces can be provided through network connections connected through communication port 1360. External storage device 1310 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   receiving, by an internal switch running on a primary virtualized network security device, a packet via a sub-interface of a physical Ethernet interface of the primary virtualized network security device, wherein the sub-interface is assigned a media access control (MAC) address based on a MAC address of the physical Ethernet interface, and wherein the primary virtualized network security device and a secondary virtualized network security device are part of a high-availability (HA) cluster;

causing, by the internal switch, a first forwarding database maintained by the primary virtualized network security device within a kernel space of a first network security operating system running on the primary virtualized network device to learn or update an association between a source MAC address of the packet and the sub-interface by storing an entry in the first forwarding database containing the source MAC address and information regarding the sub-interface; and performing real-time synchronization of the first forwarding database and a second forwarding database maintained by the secondary virtualized network security device within a kernel space of a second network security operating system running on the secondary virtualized network security device by responsive to the learned or updated association:

transferring, via a first interprocess communication (IPC) interface of the first network security operating system, information regarding the entry from the kernel space of the first network security operating system to a first synchronization process running within a user space of the first network security operating system, wherein the first IPC interface comprises a first socket established between a process in the kernel space of the first network security operating system and the first synchronization process; and causing, by the first synchronization process, the second forwarding database to be updated by responsive to receipt of the information regarding the entry, by transmitting, via a host-to-host communication service, the information regarding the entry to a second synchronization process running within a user space of the second network security operating system.

2. The method of claim 1, further comprising when an entry in the second forwarding database expires and has been removed from the second forwarding database:

receiving, by the first synchronization process, via the host-to-host communication service, a message requesting a corresponding entry to the expired entry;

transferring, by the first synchronization process via a system call of the first network security operating system, a request for the corresponding entry to the kernel space of the first network security operating system; and when the corresponding entry exists in the first forwarding database, causing the corresponding entry to be added to the second forwarding database by transmitting, via the host-to-host communication service, information regarding the corresponding entry to the second synchronization process.

3. The method of claim 1, further comprising when an entry in the second forwarding database expires:

removing the expired entry from the second forwarding database;

transferring, via a second IPC interface of the second network security operating system, information regarding the expired entry from the kernel space of the second network security operating system to the second synchronization process; and determining whether the expired entry has also expired within the first forwarding database by requesting, by the second synchronization process, information regarding a corresponding entry to the expired entry from the first forwarding database by issuing a query via the host-to-host communication service, to the first synchronization process; and when said determining is negative, then adding the corresponding entry returned responsive to the query to the second forwarding database.

4. The method of claim 1, further comprising when an additional secondary virtualized network security device joins the HA cluster:

receiving, by the first synchronization process, via the host-to-host communication service, a message requesting entries associated with a particular virtual domain (VDOM) associated with the HA cluster from the first forwarding database; and responsive to the message, for each VDOM entry of the entries:

transferring, by the first synchronization process via a system call of the first network security operating system, a request for the VDOM entry to the kernel space of the first network security operating system; and synchronizing the VDOM entry to a forwarding database maintained by the additional secondary virtualized network security device by responsive to a response to the request, transferring, via the first IPC interface, information regarding the VDOM entry to a third synchronization process running in a user space of a third network security operating system running on the additional secondary virtualized network security device.

5. The method of claim 1, wherein the first synchronization process comprises a daemon.

6. The method of claim 1, wherein the host-to-host communication service comprises a Transmission Control Protocol (TCP)/User Datagram Protocol (UDP) socket established between the first synchronization process and the second synchronization process.

7. The method of claim 3, wherein the second IPC interface comprises a second socket established between a process in the kernel space of the second network security operating system and the second synchronization process.

8. The method of claim 7, wherein the second synchronization process comprises a daemon.

9. The method of claim 4, wherein the system call comprises an input/output control (ioctl) system call.

10. The method of claim 1, wherein the physical Ethernet interface comprises any or a combination of an aggregate interface or a Virtual Local Area Network (VLAN) interface.

11. A non-transitory computer-readable storage medium embodying a set of instructions, which when executed by one or more processors of a primary virtualized network device of a high-availability (HA) cluster, causes the one or more processors to perform a method comprising:

receiving, by an internal switch running on the primary virtualized network security device, a packet via a sub-interface of a physical Ethernet interface of the primary virtualized network security device, wherein the sub-interface is assigned a media access control (MAC) address based on a MAC address of the physical Ethernet interface, and wherein a secondary virtualized network security device is also part of the HA cluster;

causing, by the internal switch, a first forwarding database maintained by the primary virtualized network security device within a kernel space of a first network security operating system running on the primary virtualized network device to learn or update an association between a source MAC address of the packet and the sub-interface by storing an entry in the first forwarding database containing the source MAC address and information regarding the sub-interface; and performing real-time synchronization of the first forwarding database and a second forwarding database maintained by the secondary virtualized network security device within a kernel space of a second network security operating system running on the secondary virtualized network security device by responsive to the learned or updated association:

transferring, via a first interprocess communication (IPC) interface of the first network security operating system, information regarding the entry from the kernel space of the first network security operating system to a first synchronization process running within a user space of the first network security operating system, wherein the first IPC interface comprises a first socket established between a process in the kernel space of the first network security operating system and the first synchronization process; and causing, by the first synchronization process, the second forwarding database to be updated by responsive to receipt of the information regarding the entry, by transmitting, via a host-to-host communication service, the information regarding the entry to a second synchronization process running within a user space of the second network security operating system.

12. The non-transitory computer-readable storage medium of claim 11, wherein the method further comprises when an entry in the second forwarding database expires and has been removed from the second forwarding database:

receiving, by the first synchronization process, via the host-to-host communication service, a message requesting a corresponding entry to the expired entry;

transferring, by the first synchronization process via a system call of the first network security operating system, a request for the corresponding entry to the kernel space of the first network security operating system; and when the corresponding entry exists in the first forwarding database, causing the corresponding entry to be added to the second forwarding database by transmitting, via the host-to-host communication service, information regarding the corresponding entry to the second synchronization process.

13. The non-transitory computer-readable storage medium of claim 11, wherein the method further comprises when an additional secondary virtualized network security device joins the HA cluster:

receiving, by the first synchronization process, via the host-to-host communication service, a message requesting entries associated with a particular virtual domain (VDOM) associated with the HA cluster from the first forwarding database; and responsive to the message, for each VDOM entry of the entries:

transferring, by the first synchronization process via a system call of the first network security operating system, a request for the VDOM entry to the kernel space of the first network security operating system; and synchronizing the VDOM entry to a forwarding database maintained by the additional secondary virtualized network security device by responsive to a response to the request, transferring, via the first IPC interface, information regarding the VDOM entry to a third synchronization process running in a user space of a third network security operating system running on the additional secondary virtualized network security device.

14. The non-transitory computer-readable storage medium of claim 13, wherein the first synchronization process comprises a daemon.

15. The non-transitory computer-readable storage medium of claim 11, wherein the host-to-host communication service comprises a Transmission Control Protocol (TCP) / User Datagram Protocol (UDP) socket established between the first synchronization process and the second synchronization process.

16. The non-transitory computer-readable storage medium of claim 11, wherein the second synchronization process comprises a daemon.

17. The non-transitory computer-readable storage medium of claim 12, wherein the system call comprises an input/output control (ioctl) system call.

18. The non-transitory computer-readable storage medium of claim 11, wherein the physical Ethernet interface comprises any or a combination of an aggregate interface or a Virtual Local Area Network (VLAN) interface.

19. A virtualized network security device comprising:

a processing resource; and a non-transitory computer-readable medium, coupled to the processing resource, having stored therein instructions that when executed by the processing resource cause the processing resource to perform a method comprising:

operating as part of a high-availability (HA) cluster, wherein the HA cluster includes a second virtualized network security system;

receiving, by an internal switch running on the primary virtualized network security system, a packet via a sub-interface of a physical Ethernet interface of the virtualized network security device, wherein the sub-interface is assigned a media access control (MAC) address based on a MAC address of the physical Ethernet interface;

causing, by the internal switch, a first forwarding database maintained by the virtualized network security system within a kernel space of a first network security operating system running on the virtualized network device to learn or update an association between a source MAC address of the packet and the sub-interface by storing an entry in the first forwarding database containing the source MAC address and information regarding the sub-interface; and performing real-time synchronization of the first forwarding database and a second forwarding database maintained by the secondary virtualized network security device within a kernel space of a second network security operating system running on the secondary virtualized network security system by responsive to the learned or updated association:

transferring, via a first interprocess communication (IPC) interface of the first network security operating system, information regarding the entry from the kernel space of the first network security operating system to a first synchronization process running within a user space of the first network security operating system, wherein the first IPC interface comprises a first socket established between a process in the kernel space of the first network security operating system and the first synchronization process; and causing, by the first synchronization process, the second forwarding database to be updated by responsive to receipt of the information regarding the entry, by transmitting, via a host-to-host communication service, the information regarding the entry to a second synchronization process running within a user space of the second network security operating system.

20. The system of claim 19, wherein the method further comprises when an entry in the second forwarding database expires and has been removed from the second forwarding database:

receiving, by the first synchronization process, via the host-to-host communication service, a message requesting a corresponding entry to the expired entry;

transferring, by the first synchronization process via a system call of the first network security operating system, a request for the corresponding entry to the kernel space of the first network security operating system; and when the corresponding entry exists in the first forwarding database, causing the corresponding entry to be added to the second forwarding database by transmitting, via the host-to-host communication service, information regarding the corresponding entry to the second synchronization process.

21. The system of claim 19, wherein the method further comprises when an additional secondary virtualized network security device joins the HA cluster:

receiving, by the first synchronization process, via the host-to-host communication service, a message requesting entries associated with a particular virtual domain (VDOM) associated with the HA cluster from the first forwarding database; and responsive to the message, for each VDOM entry of the entries:

transferring, by the first synchronization process via a system call of the first network security operating system, a request for the VDOM entry to the kernel space of the first network security operating system; and synchronizing the VDOM entry to a forwarding database maintained by the additional secondary virtualized network security device by responsive to a response to the request, transferring, via the first IPC interface, information regarding the VDOM entry to a third synchronization process running in a user space of a third network security operating system running on the additional secondary virtualized network security device.

22. The system of claim 21, wherein the first synchronization process comprises a daemon.

23. The system of claim 19, wherein the host-to-host communication service comprises a Transmission Control Protocol (TCP)/User Datagram Protocol (UDP) socket established between the first synchronization process and the second synchronization process.

24. The system of claim 19, wherein the second synchronization process comprises a daemon.

25. The system of claim 20, wherein the system call comprises an input/output control (ioctl) system call.

26. The system of claim 19, wherein the physical Ethernet interface comprises any or a combination of an aggregate interface or a Virtual Local Area Network (VLAN) interface.

* * * * *